(12) United States Patent
Fayad et al.

(10) Patent No.: US 7,818,574 B2
(45) Date of Patent: *Oct. 19, 2010

(54) SYSTEM AND METHOD FOR PROVIDING DYNAMICALLY AUTHORIZED ACCESS TO FUNCTIONALITY PRESENT ON AN INTEGRATED CIRCUIT CHIP

(75) Inventors: Camil Fayad, Poughkeepsie, NY (US); John K. Li, Woodstock, NY (US); Siegfried Sutter, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 1398 days.

This patent is subject to a terminal disclaimer.

(21) Appl. No.: 10/938,808

(22) Filed: Sep. 10, 2004

(65) Prior Publication Data

US 2006/0059345 A1 Mar. 16, 2006

(51) Int. Cl.
*H04L 9/32* (2006.01)

(52) U.S. Cl. .................. 713/175; 713/173; 713/192; 713/194; 713/156; 726/27; 726/34

(58) Field of Classification Search ................ 713/173, 713/175, 156, 192, 194; 726/27, 34
See application file for complete search history.

(56) References Cited

U.S. PATENT DOCUMENTS

| | | |
|---|---|---|
| 4,320,387 A | 3/1982 | Powell |
| 4,959,832 A | 9/1990 | Bardell |
| 5,142,578 A | 8/1992 | Matyas |
| 5,365,591 A * | 11/1994 | Carswell et al. ............. 713/164 |
| 5,533,123 A * | 7/1996 | Force et al. .................. 713/189 |

(Continued)

FOREIGN PATENT DOCUMENTS

EP 0908810 A2 6/1998

(Continued)

OTHER PUBLICATIONS

Andrews et al., "Programming Models for Hybrid CPU/FPGA Chips," IEEE Computer Society, Jan. 2004.

(Continued)

*Primary Examiner*—David García Cervetti
(74) *Attorney, Agent, or Firm*—Steven Chiu, Esq.; Blanche E. Schiller, Esq.; Heslin Rothenberg Farley & Mesiti P.C.

(57) ABSTRACT

A mechanism is provided in which access to the functionality present on an integrated circuit chip is controllable via an encrypted certificate of authority which includes time information indicating allowable periods of operation or allowable duration of operation. The chip includes at least one cryptographic engine and at least one processor. The chip also contains hard coded cryptographic keys including a chip private key, a chip public key and a third party's public key. The chip is also provided with a battery backed up volatile memory which contains information which is used to verify authority for operation. The certificate of authority is also used to control not only the temporal aspects of operation but is also usable to control access to certain functionality that may be present on the chip, such as access to some or all of the cryptographic features provided in conjunction with the presence of the cryptographic engine, such as key size.

20 Claims, 12 Drawing Sheets

U.S. PATENT DOCUMENTS

| | | | |
|---|---|---|---|
| 5,577,121 A * | 11/1996 | Davis et al. | 705/67 |
| 5,615,263 A * | 3/1997 | Takahashi | 713/164 |
| 5,666,411 A * | 9/1997 | McCarty | 705/51 |
| 5,708,715 A * | 1/1998 | Vicard | 713/191 |
| 5,761,309 A * | 6/1998 | Ohashi et al. | 713/156 |
| 5,764,761 A * | 6/1998 | Vicard | 713/189 |
| 5,787,172 A * | 7/1998 | Arnold | 713/175 |
| 5,825,878 A * | 10/1998 | Takahashi et al. | 713/190 |
| 5,923,759 A | 7/1999 | Lee | |
| 5,970,147 A * | 10/1999 | Davis | 713/172 |
| 5,995,628 A * | 11/1999 | Kitaj et al. | 713/164 |
| 6,038,551 A * | 3/2000 | Barlow et al. | 705/41 |
| 6,058,483 A * | 5/2000 | Vannel | 713/156 |
| 6,076,162 A * | 6/2000 | Deindl et al. | 713/159 |
| 6,094,724 A * | 7/2000 | Benhammou et al. | 726/20 |
| 6,141,756 A | 10/2000 | Bright | |
| 6,148,400 A * | 11/2000 | Arnold | 713/168 |
| 6,212,634 B1 * | 4/2001 | Geer et al. | 713/156 |
| 6,233,685 B1 * | 5/2001 | Smith et al. | 713/194 |
| 6,247,129 B1 * | 6/2001 | Keathley et al. | 713/156 |
| 6,260,087 B1 | 7/2001 | Chang | |
| 6,289,454 B1 * | 9/2001 | Eslinger et al. | 713/189 |
| 6,339,824 B1 * | 1/2002 | Smith et al. | 713/157 |
| 6,366,117 B1 | 4/2002 | Pang | |
| 6,378,072 B1 * | 4/2002 | Collins et al. | 713/187 |
| 6,384,628 B1 | 5/2002 | Lacey | |
| 6,385,723 B1 * | 5/2002 | Richards | 713/160 |
| 6,456,716 B1 * | 9/2002 | Arnold | 380/277 |
| 6,457,125 B1 * | 9/2002 | Matthews et al. | 713/160 |
| 6,473,743 B1 * | 10/2002 | Ryan, Jr. | 705/60 |
| 6,477,646 B1 * | 11/2002 | Krishna et al. | 713/189 |
| 6,567,915 B1 * | 5/2003 | Guthery | 713/168 |
| 6,598,165 B1 * | 7/2003 | Galasso | 713/189 |
| 6,711,263 B1 * | 3/2004 | Nordenstam et al. | 380/282 |
| 6,804,696 B2 | 10/2004 | Chen | |
| 6,819,133 B1 | 11/2004 | Kliesner | |
| 6,895,504 B1 * | 5/2005 | Zhang et al. | 713/175 |
| 6,996,713 B1 | 2/2006 | Pecso | |
| 7,005,733 B2 * | 2/2006 | Kommerling et al. | 257/679 |
| 7,062,657 B2 * | 6/2006 | Law | 713/189 |
| 7,177,975 B2 * | 2/2007 | Toombs et al. | 711/103 |
| 7,194,623 B1 * | 3/2007 | Proudler et al. | 713/164 |
| 7,203,842 B2 * | 4/2007 | Kean | 713/189 |
| 7,251,804 B1 | 7/2007 | Trimberger | |
| 7,257,715 B2 * | 8/2007 | Yamane | 713/189 |
| 7,284,122 B2 * | 10/2007 | Gilbert et al. | 713/159 |
| 7,313,679 B2 * | 12/2007 | Ranganathan | 713/1 |
| 7,383,445 B2 * | 6/2008 | Tomohiro | 713/193 |
| 7,440,572 B2 * | 10/2008 | Dellmo et al. | 380/270 |
| 7,548,620 B2 * | 6/2009 | Popp | 380/273 |
| 7,634,665 B2 * | 12/2009 | Johnson | 713/189 |
| 2001/0001155 A1 * | 5/2001 | Smith et al. | 713/170 |
| 2001/0015919 A1 * | 8/2001 | Kean | 365/200 |
| 2001/0032318 A1 * | 10/2001 | Yip et al. | 713/190 |
| 2001/0037458 A1 * | 11/2001 | Kean | 713/193 |
| 2002/0004905 A1 * | 1/2002 | Davis et al. | 713/193 |
| 2002/0094087 A1 * | 7/2002 | Dellmo et al. | 380/270 |
| 2002/0165912 A1 | 11/2002 | Wenocur | |
| 2002/0166062 A1 | 11/2002 | Helbig, Sr. | 713/200 |
| 2002/0184046 A1 | 12/2002 | Kamada | |
| 2002/0199110 A1 * | 12/2002 | Kean | 713/189 |
| 2003/0005292 A1 * | 1/2003 | Matthews et al. | 713/160 |
| 2003/0086300 A1 | 5/2003 | Noyes | |
| 2003/0099358 A1 * | 5/2003 | Michael et al. | 380/270 |
| 2003/0133574 A1 | 7/2003 | Caronni | |
| 2003/0159038 A1 * | 8/2003 | Gilbert et al. | 713/168 |
| 2003/0163431 A1 | 8/2003 | Ginter et al. | 705/64 |
| 2004/0039906 A1 * | 2/2004 | Oka et al. | 713/156 |
| 2004/0059916 A1 * | 3/2004 | Mizushima et al. | 713/172 |
| 2004/0064457 A1 * | 4/2004 | Zimmer et al. | 707/100 |
| 2004/0146163 A1 * | 7/2004 | Asokan et al. | 380/277 |
| 2004/0185842 A1 * | 9/2004 | Spaur et al. | 455/420 |
| 2005/0005098 A1 * | 1/2005 | Michaelis et al. | 713/156 |
| 2005/0005161 A1 * | 1/2005 | Baldwin | 713/200 |
| 2005/0033956 A1 * | 2/2005 | Krempl | 713/156 |
| 2005/0066168 A1 * | 3/2005 | Walmsley | 713/169 |
| 2005/0138387 A1 * | 6/2005 | Lam et al. | 713/185 |
| 2005/0154877 A1 * | 7/2005 | Trench | 713/156 |
| 2005/0246553 A1 * | 11/2005 | Nakamura et al. | 713/193 |
| 2006/0059368 A1 | 3/2006 | Fayad | |
| 2006/0059369 A1 | 3/2006 | Fayad | |
| 2006/0059372 A1 | 3/2006 | Fayad | |
| 2006/0059373 A1 | 3/2006 | Fayad | |
| 2006/0059574 A1 | 3/2006 | Fayad | |

FOREIGN PATENT DOCUMENTS

| | | |
|---|---|---|
| WO | 01/45318 | 6/2001 |

OTHER PUBLICATIONS

Fayad, Camil, "Montgomery Modular Arithmetic Implementation in Crypto Engines for System on Chip (SOC) Design," Thesis submitted to SUNY at Buffalo, Dec. 2003.

"Security Requirements for Cryptographic Modules," Federal Information Processing Standards Pub. FIPS PUB 140-2, Information Technology Laboratory, National Institute of Standards and Technology, Gaithersburg MD 20899-8900, May 25, 2001.

"Secure Hash Standard," Federal Information Processing Standards Pub. FIPS PUB 180-1, Computer Systems Laboratory, National Institute of Standards and Technology, Gaithersburg MD 20899, Apr. 17, 1995.

"Secure Hash Standard," Federal Information Processing Standards Pub. FIPS PUB 180-2, National Institute of Standards and Technology, Aug. 1, 2002.

IBM 4758 Model 13 Security Policy, Secure Systems and Smart Cards Group, IBM T.J. Watson Research Center, Nov. 1999.

Smith, SW et al., "Building a High-Performance, Programmable Secure CoProcessor," Computer Networks, Elsevier Science Publishers BV, Amsterdam, NL, Apr. 23, 1999, pp. 831-860.

\* cited by examiner

SYSTEM AND METHOD FOR PROVIDING DYNAMICALLY AUTHORIZED ACCESS TO FUNCTIONALITY PRESENT ON AN INTEGRATED CIRCUIT CHIP

BACKGROUND OF THE INVENTION

The present invention is generally directed to a system and method for providing secure cryptographic functions on a single chip. The present invention is also described herein as providing secure Cryptography On A CHip (COACH). From a general viewpoint, the present invention provides a secure method for establishing secure communications between the outside world and the internals of a cryptographic system capable of accessing and utilizing a plurality of cryptographic engines and adaptable algorithms for controlling and utilizing these engines. More particularly, the present invention employs a single chip which includes a field programmable gate array (FPGA) to provide this enhanced and flexible cryptographic functionality in a secure manner and environment. In another aspect of the present invention, communication is provided to an external memory which is controllably dividable into secure and nonsecure portions. In further aspects of the present invention additional power and flexibility is provided through the use of multiple COACH systems which, because of the secure ways of providing communication to levels of functionality deep within each chip, can now interact amongst themselves in a secure fashion as well as individually, thus providing methods for cross checking and double checking the functioning of individual COACH systems. On another level, the present invention also provides a secure mechanism for programming an FPGA.

The present invention may also be viewed from an entirely different perspective. In particular, the present chip may be viewed as a processor or set of processors access to the functionality of which is securely controlled. It is also to be noted that, in this regard, one or more of the included processors may be a digital signal processor. Such an arrangement is useful for the secure control of digital media including voice, sound and video. Other types of processing elements may also be included. In this view, the fundamental components on the chip are the processors and the cryptographic engines deployed therewith are present in order to provide secure and/or authorized control of the processing elements. On the other hand, as viewed from the perspective first presented above, the central elements comprise cryptographic engines which are controllable in a wide variety of fashions, the goal of which is to provide cryptographic functions, such as encoding, decoding and the primitive operations of modular arithmetic, particularly modular exponentiation.

The present invention may yet be viewed from a third perspective. In this view, the main component is the FPGA portion. In this regard the present invention provides a mechanism for programming this component from outside the chip. In particular, the FPGA programming is now capable of being carried out in a secure manner. The authorization for modifying any FPGA component is protected by secure cryptographic functions. Existing FPGA data can neither be discerned nor modified, except as specifically authorized in accordance with encoded information stored within the device in a volatile memory which is erased if tampering is discerned.

The art of cryptography has been employed at least since the time of Caesar in ancient Rome to provide a secure method of communication. In the modern world cryptography has taken on an equally important role particularly in securing worldwide financial transactions. The structures of modern cryptographic systems have also expanded the role of cryptography so as to also permit the use of cryptographic engines for the purposes of authentication, verification and trusted transaction processing. The fulfillment of these roles has been provided in many different ways but with all of these ways having the common feature that they are designed to prevent one or another forms of attack. These attacks can be either physical in nature or algorithmic. From the point of view of the algorithms and programming that have been deployed in the service of secure communications, protection against attack has typically been enhanced through the use of cryptographic keys of ever increasing length chosen to outmatch the increasing power of data processing systems used to break cryptographic codes. From the point of view of hardware attacks, many different methods have been employed to provide physical security. These include systems which detect attempts at physical or electrical intrusion and self-destruct as a result of these intrusion attempts.

One of the physical systems for protecting cryptographic circuit chips involves the inclusion of a mesh that surrounds the chip. This mesh detects attempts at physical intrusion to the chip. However, the presence of the mesh introduces problems of heat dissipation since it inhibits the flow of thermal energy from the interior regions of the chip to the outside of the mesh. The presence of the mesh structure thus serves to prevent the inclusion of more powerful and denser chip circuits, processors and components, since such inclusions mean an increase in power dissipation which could result in component failure or reliability problems due to the increased heat whose removal is impeded by the mesh. Another disadvantage of using a mesh for tamper detection is that its use requires the inclusion of a number of analog devices; such devices are not easily integrated on the same circuit substrate as digital components and even if they were easy to incorporate, the heat dissipation problems would still remain.

Since the present invention relates to cryptographic processing systems and, even more particularly to systems of this nature implemented with integrated circuit chips, it is useful to point out the existence of the Federal Information Processing Standards (FIPS) publication titled "Security Requirements for Cryptographic Modules" (FIPS PUB 140-2 issued May 25, 2001 which supersedes FIPS PUB 140-1 dated Jan. 11, 1994). This publication discusses four levels of security from the lowest level of security (Security Level 1) to the highest level of security (Security Level 4). The present invention is capable of implementing the highest level of security described therein. An example of a Security Level 1 cryptographic module is described therein as being represented by a Personal Computer (PC) encryption board. Security Level 2 goes further in that it requires that any evidence of an attempt at physical tampering be present. Security Level 3 goes even further in that it attempts to thwart any attempts at tampering. This level of security also requires identity-based authentication mechanisms. Security Level 3 also requires that the input or output of plaintext "critical security parameters" (that is, "CSPs" such as unencrypted key information, which for single pass encryption processes may be human readable) to be performed through ports that are physically separated from other ports or interfaces. In Security Level 4 a complete envelope of protection around the cryptographic module is provided with the intent of detecting and responding to all unauthorized attempts at physical access with the penetration of the module enclosure resulting in the immediate zeroization of all plaintext critical security parameters.

Certain terms, abbreviations and acronyms are used in the present application. These terms are well understood in the arts of cryptography and integrated circuit chip design. Nonetheless, for convenience they are presented in the two tables below as an aid to the reader:

TABLE I

| | |
|---|---|
| ASIC | Application Specific Integrated Circuit |
| COACH | Cryptography On A CHip |
| FIPS | Federal Information Processing Standards |
| FIPS 140-2 | NIST Standard: Security Requirements for Cryptographic Modules |
| FLASH | Nonvolatile memory |
| FPGA | Field Programmable Gate Array |
| eDRAM | embedded Dynamic Random Access Memory |
| MD5 | Message Digest (Hash) algorithm (by RIVEST; RSA Security) |
| NIST | National Institute of Standards and Technology |
| PCI | Peripheral Computer Interconnect |
| TRNG | True Random Number Generator |
| SHA | Message Digest (Hash) algorithm [NIST FIPS 180-2] |
| UTC | Coordinated Universal Time (worldwide system of civil time basis) |

TABLE II

| | |
|---|---|
| Chip Hardware Manufacturer | Manufactures the chip hardware with the chip private and public key as well as the Chip Vendor's public key (in fuses). |
| Chip Hardware Vendor/Reseller | Will place the chip on a card, board or an other chip carrier. Creates the FPGA file encrypted under the Chip Vendor's private key and encrypts the file with the Chip public key again. |
| Platform Manufacturer | Installs the chip (on card) into the platform and attaches the batteries at the customer site (or platform manufacturer site). Loads the encrypted FPGA code (netlist) followed by loading the encrypted, different code layers including the Kernel (Operating System) and usage specific software code (to enable, among other things, API calls). |
| Chip Software Vendor | Selects/enables the options for the SW cryptographic functions of the chip. (cryptographic APIs, performance feature, level of security, On-Demand feature, leasing and billing modes). |

MD5 (Message Digest 5) is used, for example, in digital signature generation where large data blocks (the message) is to be compressed in a secure manner. PCI is a local (internal) computer bus standard promoted by Intel, Inc. True random numbers are typically generated by sampling and processing hardware noise. For high security environments the random numbers are generated inside the secured boundary.

The present invention is not limited to the use of any particular cryptographic engine. In fact, the present invention may employ a plurality of distinct cryptographic engines. In this regard, it should be understood that, as used herein, the term "cryptographic engine" refers to any circuit designed to perform modular exponentiation or any other cryptographic algorithm. Modular exponentiation is the same as the normal exponentiation process except that the result is taken modulo a large number, which is a prime number so as to be operable to provide encryption and decryption operations.

One of the other features that one would wish to have in a cryptographic system is a higher level of reliable operation than is employed for secure and also for nonsecure transactions. One would also like to be able to employ existing processor designs for incorporation within the structure of a single chip. Clearly, the single chip architecture is much to be preferred since it presents a much more well-defined and defendable boundary. However, extant processors that could be employed to provide on-chip data processing and computational flow typically do not always incorporate the desired level of redundancy. Hence, the use of these processor designs, without more, fails to provide the correspondingly desired level of data integrity and reliability. Likewise, availability and serviceability may also be affected. Accordingly, in preferred embodiments of the present invention, parity is encrypted along with any processor instructions that are written to the external memory. Additionally, when encrypted instructions stored in the "safe" area of the external memory are decrypted, the parity is then checked for data correctness. The inclusion of the parity bit with the instruction makes attacks very difficult since not only is the parity likely to be affected, but it is also the case that the decrypted instruction will be determined to have been tampered with. The failure of a parity check subsequent to instruction decryption provides a good indication that processing should be stopped and/or that an attempted attack has occurred. Stopping at this point promotes continued confidentiality and data integrity.

One of the many problems that one would like to solve in the context of developing a new cryptographic processor is the presence of a large number of applications relating to encryption, decryption, authentification and verification. If these applications were to be stored in their clear form outside of a secure boundary, they would be easy targets for an attack. In these situations code can be changed in the non secure memory and the new code used to access secret data contained within the "secure" boundary. This is clearly an undesirable result and at best precludes the use of legacy code. Accordingly, the present invention provides access to an external memory which includes two portions: one devoted to encrypted data and another devoted to unencrypted data (that is, to "data in the clear" or what is the same, to "clear data"). The boundary between these two memory portions is adjustable but only from within the secure COACH boundary.

The system described herein provides a number of distinct advantages. For example, the invention provides a completely integrated environment in which it is not necessary to expose any unencrypted signals to any other system component such as buses or internal memory interfaces. Access to other secure external COACH systems is still encrypted but the secrets used during encryption are kept within the same physical enclosure as the encryption engine. In nonintegrated cryptographic systems, secure and persistent storage, a CPU (Central Processing Unit or, more simply, processor) must all be provided within some form of unitary, physically protected enclosure, that is, when the components of the cryptographic processing system are discrete, the physical protection scheme for the system must not only protect the discrete components themselves against attack, the physical security scheme must also protect all of the signal paths between these units. It is noted, however, that it is not only the signal paths that must be protected; the power connections must also be protected in nonintegrated solutions since attacks can also be based upon the removal or altering of power line levels directed to only one of the components, which thus renders the entire system vulnerable. In contrast, in the present invention, the cryptographic processing system components exist on the same circuit chip and are thus naturally coupled. No outside circuitry is needed to insure security such as might be provided by a separate circuit which detects tampering and performs a zeroing of RAM and/or other related buffers and registers.

SUMMARY OF THE INVENTION

In accordance with a preferred embodiment of the present invention, a system and methods are provided relating to an architecture for a secure, single chip cryptographic processor. The present invention is also directed to method for exploiting this architecture to provide users with options of security level versus operational speeds. The present invention employs one or more separate cryptographic engines all of which are controlled through secure internal communications links with the external environment. In one aspect, the present invention comprises a system for providing security functions using a secure, single chip cryptographic processor capable of internally controlled access to an external memory having one portion for holding encrypted data and another portion for holding unencrypted data. In another aspect, the present invention comprises a system for providing security functions using a single chip cryptographic processor whose control functions are invokable only through encrypted signals. Put another way, the present invention also includes a cryptographic processor architecture in which external access is provided only through communication paths that carry encrypted signals.

Thus, the present invention is directed to more than cryptographic engines per se but rather employs one or more such engines in a secure fashion to accomplish a number of objectives. At one level, the architecture of the present invention is directed to a single chip which is made secure by ensuring that, in order to invoke its functions, only encrypted commands are allowed to be processed. Nonetheless, access is provided to an external Random Access Memory (RAM) which is controllably partitioned into encrypted and unencrypted portions under sole control of secure internal chip functions. In one aspect of the present invention encryption and decryption operations are performed through direct control of individual cryptographic engines. In another aspect, security functions, including encryption and decryption are performed through the invocation of commands and stored programs executed by an internal microprocessor element such as those defined by applicant's assignee's PowerPC series of chip products. Typically, a subset of an entire one of these processing elements is employed. The included microprocessor has an external volatile RAM (still internal to the chip, but external to the processing element itself) which includes an operating system, such as Linux, for example. The processing element may, however, also include its own internal RAM. The only access to the internal RAM is provided through an internal, secure flow control switch which is at least partially implemented using FPGA logic circuits which fact provides additional and significant flexibility and control. However, it is noted that this flow control switch functions as more than just a simple on-off switch; rather, it operates as a switch in the sense of controlling the flow of information between and among other internal components. It is also noted that the aforementioned operating system is preferably provided within on-chip RAM for purposes of performance; it is not a FIPS requirement.

In another aspect of the present invention, individual architected chips of the present invention are connected together in a cooperative arrangement in which one or more COACH systems provide checking capabilities for the other COACH chips and/or provide increased processing capabilities. All of the additional capabilities are provided without any sacrifice to the level of security provided by a single chip COACH system and without any compromises with respect to invulnerability to attack.

Accordingly, it is an object of the present invention to provide a cryptographic processing element on a single, secure integrated circuit chip.

It is also an object of the present invention to provide a cryptographic processing system which is extremely resistant to security attacks.

It is yet another object of the present invention to provide a cryptographic processing system whose functions, commands and operations are only accessed through the use of already encrypted signals.

It is a still further object of the present invention to provide a cryptographic processor architecture which is flexible but which can still communicate with external Random Access Memory in a secure fashion.

It is another object of the present invention to provide an architecture for a cryptographic processor which is capable of secure communications with other such processors.

It is still another object of the present invention to provide a cryptographic processor which includes one or more cryptographic engines which are accessed through a fast path instruction which avoids internal microprocessor involvement.

It is a yet further object of the present invention to provide a cryptographic processor which is implemented within the confines of a single chip.

It is also an object of the present invention to provide a cryptographic processor which is not only tamper resistant but is tamper responding.

It is yet another object of the present invention to provide a cryptographic processor which is capable of communication with other, similarly architected processors in a secure manner to enhance performance and/or to provide greater RAS characteristics.

Lastly, but not limited hereto, it is an object of the present invention to provide enhanced, flexible, expandable, fast, efficient and secure cryptographic functionality, particularly for data processing systems and other communication needs.

The recitation herein of a list of desirable objects which are met by various embodiments of the present invention is not meant to imply or suggest that any or all of these objects are present as essential features, either individually or collectively, in the most general embodiment of the present invention or in any of its more specific embodiments.

DESCRIPTION OF THE DRAWINGS

The subject matter which is regarded as the invention is particularly pointed out and distinctly claimed in the concluding portion of the specification. The invention, however, both as to organization and method of practice, together with further objects and advantages thereof, may best be understood by reference to the following description taken in connection with the accompanying drawings in which:

DETAILED DESCRIPTION OF THE INVENTION

The present invention is made possible through the utilization of three distinct technologies which, working together, provide a mechanism for the construction of a single chip device which is both extremely secure, flexible and immune from attack. In particular, the use of voltage islands on a chip has lead to the ability to employ a dual power supply for an internal volatile low power dissipation storage. The dual power supply includes a regular power supply and a battery backup. Additionally, the utilization of field programmable gate arrays (FPGAs) has led to a security system on a single chip which can be programmed in a secure manner from the outside without any degradation in the level of security provided. Thus, the present invention is able to incorporate new algorithms as they are developed as well as being able to concatenate old (or new) algorithms in new ways to achieve even higher levels of security. Lastly, in terms of the technologies that have been exploited in the design of the present invention, the increase in circuit packing density is also a significant factor.

Figure 1:
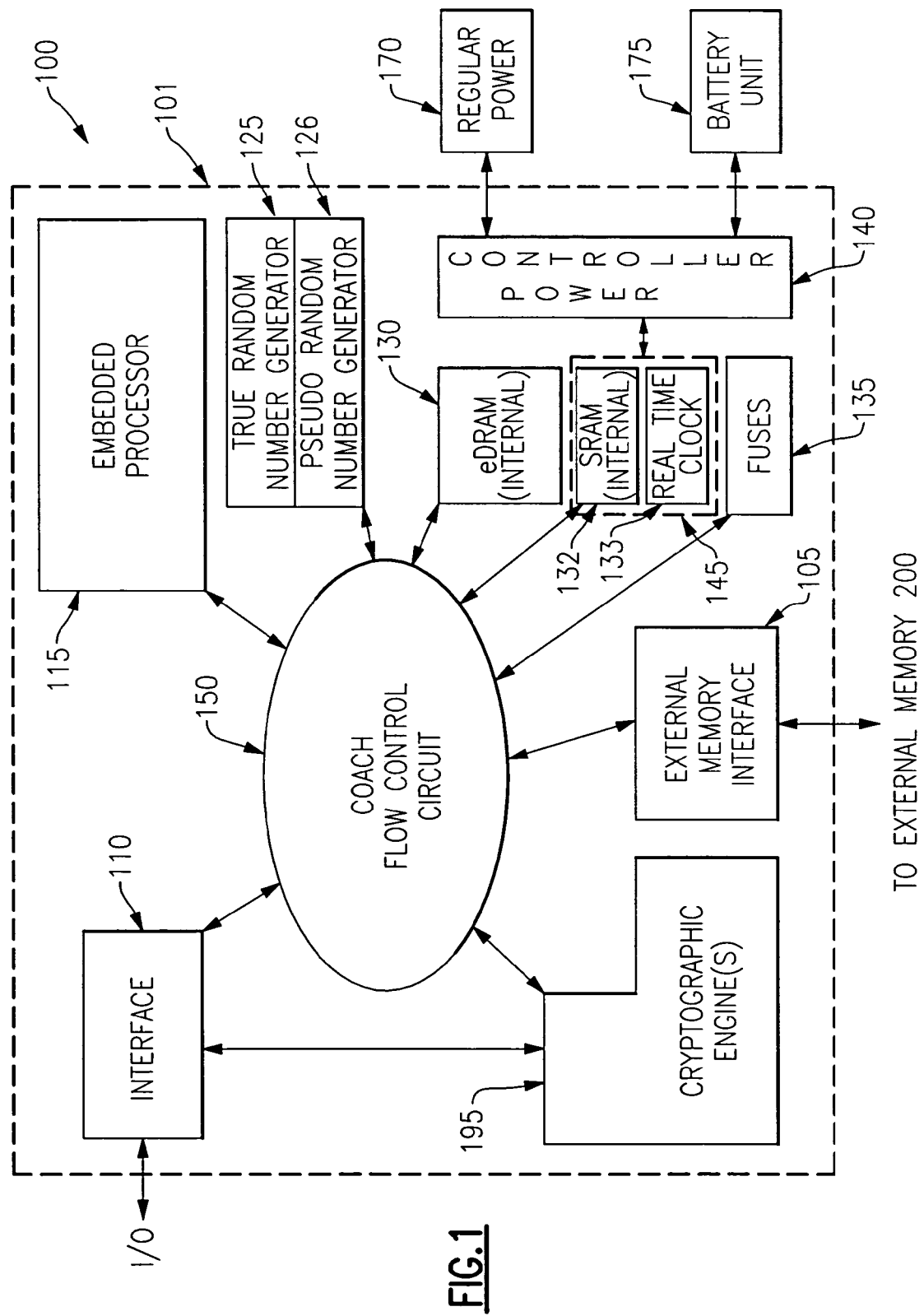
FIG. 1 is a block diagram illustrating the architecture of a single circuit chip which is intended to provide a plurality of cryptographic (and related) functions within a secure boundary and in particular, illustrating the use of combined ASIC and FPGA circuits to control the flow of information within the chip.

The overall architecture of the present invention is illustrated in FIG. 1. The invention described most thoroughly herein is directed to a secure single chip for carrying out cryptographic functions. However, as mentioned above, the mechanisms and procedures set forth herein are also more widely applicable to any situation in which one wishes to employ FPGA circuits in a fashion in which they can only be programmed in a secure manner by trusted entities having possession of appropriate cryptographic keys. Furthermore, as seen in FIG. 1, chip 100 includes embedded (micro)processor 115. This enables the generic construction of microprocessor chips where the processor is controlled in a secure manner by an FPGA which is itself programmable in an entirely secure manner (which is more particularly described below in reference to the discussions surrounding FIGS. 4 through 11). This means that any embedded processor can be controlled in a secure fashion. For example, it can be controlled so as to limit the execution of certain instructions to trusted users who can provide authenticatable keys.

In preferred embodiments of the present invention, security is also provided within secure boundary 101 which is tamper evident, resistant and responding and which meets the above described Level 4 FIPS standards. In this regard, it is noted that tamper proof enclosures do not require that a mesh be present; tamper proof enclosures can be constructed without meshes. As defined in the FIPS 140-2 standard. Further details are provided below.

Figure 2:
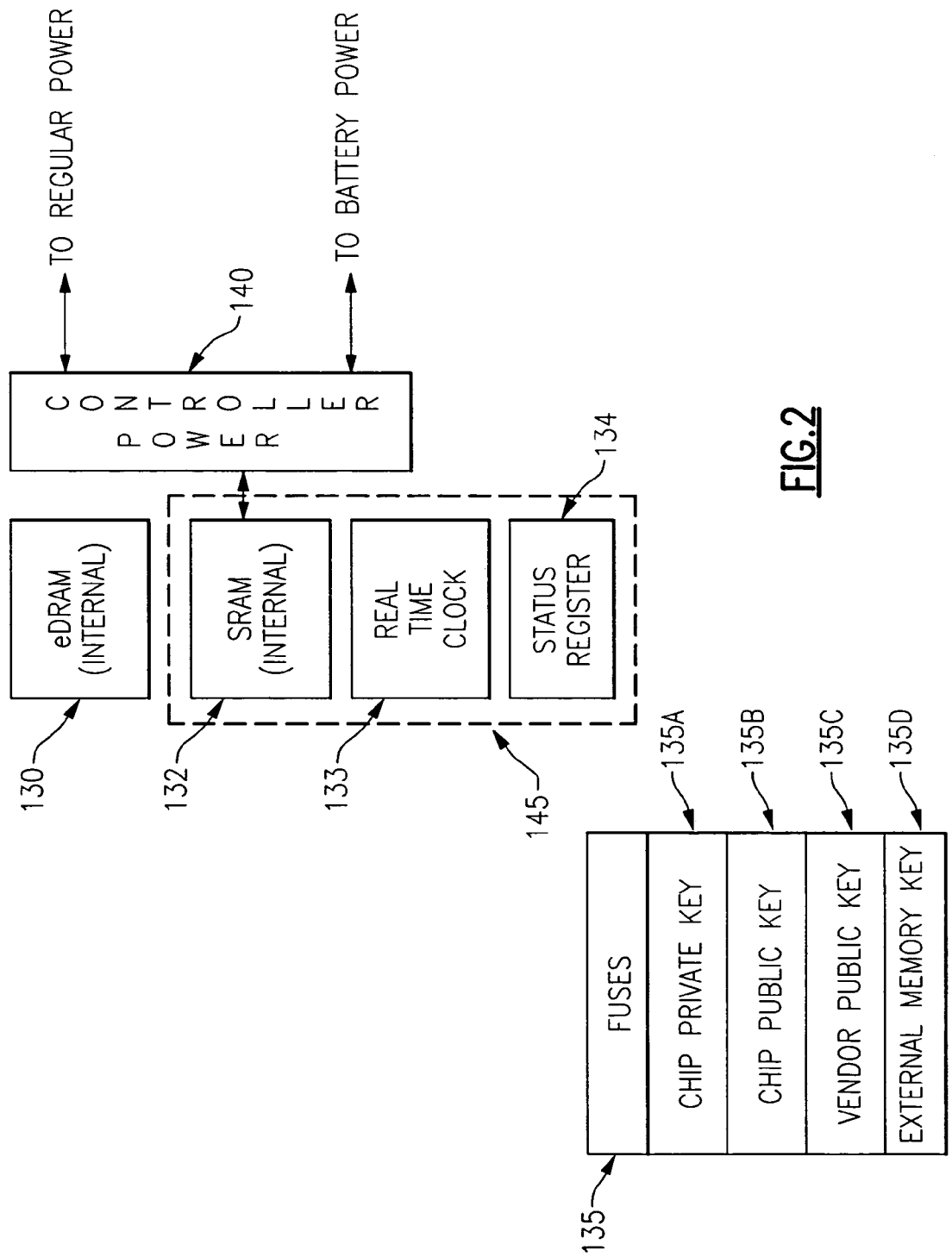
FIG. 2 is a block diagram more particularly illustrating the portion of FIG. 1 that relates to the presence of fusible elements that permanently store certain specified cryptographic keys.

The more specific, single-chip, secure cryptographic processor of the present invention comprises several principal portions: external interface 110, processor 115, cryptographic engine (or engines) 195, random number generators (125 and 126), external memory interface 105 and memory components disposed within powered voltage island 145. A more detailed view of the circuits found on voltage island 145 is shown in FIG. 2. The rest of the chip is powered separately and exists on its own voltage island. However, switching between regular power and battery power is carried out within the chip itself using a voltage regulator with the default power source being regular power and with the alternate source as a backup being a battery. There is no pin saving to be had by moving this function off of the chip. The only saving would be in the consumption of less chip circuit area but that advantage would not help to solve the latency problem for external devices. All of these components are provided on a single chip. In addition, there is provided flow control switch 150 which receives external requests through interface 110 in the form of request blocks. While component 150 is described as a switch it also includes a request block processor which receives requests blocks and, in response thereto, directs and controls the flow of information between and among the various other chip components. Most importantly for the present invention switch 150 preferably comprises two distinct components ASIC portion (Application Specific Integrated Circuit) 150A and FPGA portion 150B (see FIG. 11). ASIC portion 150A is also characterizable as a "hard wired" circuit. ASIC portion 150A is used to initialize the system, to initially process request blocks, to interface with the FPGA portion and to insure that only secure FPGA information is used to configure FPGA portion 150B of switch 150. It is the presence of securely configurable FPGA portion 150B that gives rise to a chip that has both highly secure and highly flexible characteristics whether the chip is used to provide access to cryptographic engines or for other purposes related to secure processor control. It is also noted that FPGA portion 150B makes it possible for a chip vendor to provide a completely customized processor unit (see below for a description of the distinction between a chip vendor and a chip manufacturer and their relative roles and see especially FIG. 4). With specific reference to FIG. 11 it is noted that connections from flow control circuit 150 to other components on the chip are not limited to connections that are only made to ASIC side 150A. For example, FIG. 11 should not be interpreted as indicating that there are no connections between FPGA portion 150A and cryptographic engines 195. However, it is noted that even if the chip is intended for processor control and not intended to be limited to cryptographic operations, some form of internal cryptographic engine is required to provide the encryption and decryption that makes the processing secure.

The System On a Chip (SOC or COACH) of the present invention uses voltage islands in the following way. A line for applying a voltage has two power sources for preserving data in internal, deliberately volatile SRAM memory 132. When the printed circuit card on which the COACH system is deployed is powered as normal, this normal power is used to maintain SRAM (static random access memory) 132. When the printed circuit card is powered down battery unit 175 is used to maintain data within SRAM memory 132. When neither regular power source 170 nor battery back up 175 are supplying power to power controller 140, no power is supplied to SRAM 132 and its contents vanish. This is important since there is information contained in SRAM 132 that is used to provide security. Its volatile nature insures that disconnection of the chip from a power source always results in the information stored in SRAM 132 being cleared so that it is completely inaccessible. In preferred embodiments, battery backed up SRAM 132 is employed as shown in FIG. 1. While SRAM 132 is primarily employed for the storage of critical parameters, eDRAM 130 is employed as the basic RAM for processor 115. While SRAM 132 is disposed within voltage island 145, eDRAM 130 need not be. Real Time Clock 133 is also disposed within voltage island 145. Real Time Clock 133 is not an essential element for all purposes but is useful for those circumstances in which chip features are enabled on a time limited basis. Real Time Clock 133 is also very desirably present for operating system purposes. It is furthermore necessary for operations in which security is the primary chip function, in which case it is securely initialized. Otherwise Real Time Clock 133 is loaded from the clock of the system in which the chip is incorporated. Additionally, while eDRAM 130 is also not necessarily volatile, it may be. However, access to it is granted or denied through flow control circuit 150. It is anticipated that, in normal operation, eDRAM 130 holds an operating system for the operation of processor 115. This is not, however, a requirement for the broader aspects of the present invention.

Processor 115 preferably comprises a processor having a "footprint" such as that provided by the IBM PowerPC which is manufactured and marketed by the assignee of the present invention. Processor 115 is an embedded processor and may or may not include internal error detection mechanisms such are typically provided by parity bits on a collection of internal or external signal lines. Processors that do provide some form of internal error detection are preferred since they tend to be more reliable. However, even if the processor of the present invention were to fail or to become defective, security measures are not compromised. Accordingly, because of the presence of encrypted safeguards, less complex and less expensive embedded processors 115 may be employed, if desired.

The present invention also preferably includes intrusion detection logic that is local to the interior of the single chip system. This is especially advantageous in that there are no external analog circuits required. Because of the integration of key components within a secure boundary, the single chip processor of the present invention comprises components which are much more difficult to attack, especially in a component selective manner. All access is through defined and limited interfaces: a first interface 110 which accepts commands and data (via request blocks) and a second interface 105 which exchanges data in a controlled fashion with external memory 200 which includes encrypted portion 210 and unencrypted portion 220 (see FIGS. 12, 13 and 14). The specific external memory portion that is accessed is determined entirely by address information generated from within secure boundary 101 of single chip cryptographic processor element 100. Access to external memory 200 is via this interface which is controlled by flow control switch 150. In preferred embodiments of the present invention control of access to external memory is provided through FPGA portion 150B of switch 150.

Interface 110 is the primary port for the communication of data into chip 100. Any well defined interface may be employed. However, a preferred interface is the extended PCI interface used widely within personal computers. Generally, the information that enters this port is encrypted. It is the primary port for the entry of request blocks into the chip. Typically, every portion of an entering request block, except for the command itself, comprises encrypted information. Part of the encrypted information contains a key and possibly a certificate or other indicia of authorization.

Chip 100 also includes one or more cryptography engines 195 which perform encryption and decryption operations using keys supplied to it through flow control switch 150. The cryptographic engine or engines 195 are essentially coprocessors employed by flow control switch 150 and embedded processor 115, not only to provide cryptographic services during normal operation, but just as importantly, engine(s) 195 provide a secure mechanism for structuring FPGA portion 150B of flow control switch 150. These engines also assure that appropriate keys and certificates are present when needed in SRAM 132.

These engines provide specific hardware implementations of various algorithms used in cryptography. Accordingly, the cryptographic chips of the present invention have the ability to select the hardware circuit which is most efficient for the algorithm used to encode the information. A particularly preferable cryptography engine is described in U.S. patent application Ser. No. 09/740485 filed Dec. 19, 2000. This engine provides efficiencies created by and through the recognition of the possibility of pipelining certain operations involved in multiplication modulo a large prime number. As indicated above, the present invention is also capable of employing a plurality of cryptographic engines all of which can be the same or different. In this regard it is noted that the request block (see the discussion below regarding FIG. 11) includes a field which identifies the cryptographic engine or set of cryptographic engines to be employed. However, the present invention is not limited to the use of any particular engine for encryption and decryption. Furthermore, while these engines are often based on algorithms that perform modular exponentiation operations, the present invention embraces the use of any engine, implementing any sufficiently desirably secure cryptographic algorithm or method. In particular, the present invention is not limited to the use of cryptographic engines that are based upon the public key/private key paradigm. However, some on-chip capability in the use of this paradigm is used to provide security for programmable logic devices, configuration data and for software. Moreover, it is pointed out that one of the particularly advantageous aspects of the present invention is that, with the flexibility provided by FPGA portion 150B and with the coding present in memory portions accessible to embedded processor 115, it is possible to provide cryptography services based on a plurality of serially intermixed algorithms for encryption and decryption. In short, the present invention allows the construction of an indefinite number of cryptographic schemes which are built up and used, all within the convenience of a single chip implementation. The only limitation being the increase in processing time to carry out encryption and decryption operations. However, this time usage grows only linearly.

Chip 100 is also provided with access to external memory 200. This memory is preferably a RAM device but is not so limited. Any addressable memory device may be employed. Access to external memory 200 is provided through external memory interface 105. The primary function of this interface is to enforce addressability constraints built into the present chip/system under which an external memory includes two portions: (1) a clear portion which is intended to hold only unencrypted information (but could hold encrypted information) and (2) an encrypted portion which contains only encrypted information. The partition of external memory 200 into these two portions is controlled by addressability checks performed internally to chip 100 by embedded processor 115 and either ASICs portion 150A of flow control switch 150 or by FPGA portion 150B or by some combination thereof. Furthermore, the flexible nature of FPGA 150 allows the addressability partition boundary between the two portions of external memory 200 to be set by the chip vendor (who may or may not be the same as the chip manufacturer).

Chip 100 also includes internal mechanisms for generating random numbers. For completeness two mechanisms are preferably employed: true random number generator (TRNG) 125 and pseudorandom number generator (PRNG) 126. These generators are typically used to provide seed values for the generation of random numbers used in cryptographic processes. PRNG 126 is typically implemented as a linear feedback shift register which effectively implements multiplication by so-called primitive binary polynomials having no factors. These are well known in the art. See for example U. S. Pat. No. 4,959,832 issued to Paul H. Bardell and assigned to the same assignee as the present invention. TRNG is preferably implemented through the exploitation of on-chip quantum phenomena. True random numbers are typically generated by sampling and processing a source of entropy outside of the user's environment. In the case of high security environments, the random numbers are generated inside the secured boundary. The usual method is by amplifying thermal noise generated by a resistor (Johnson Noise) or by using a semiconductor diode and feeding the bit or bits into a comparator or Schmitt trigger followed by a skew correction on the bit stream to insure an approximately even distribution of ones and zeroes.

Next is considered the circuits that are present within voltage island 145. Electrical power supplied to any and all components within voltage island 145 comes through power controller 140. Power controller 140 provides electrical power to SRAM 132. If it is anticipated that, in use or in transit, chip 100 were to be powered by a reliable source of power (mains or a relatively large battery), it would also be possible to include eDRAM 130 within voltage island 145 as well. However, since eDRAM 130 typically consumes more power than SRAM 132, it is preferred that eDRAM 130 be located outside of voltage island 145 so that it can be powered by the usual chip bus power supply lines. However, when battery backup becomes a critical power supply source, eDRAM 130 should riot be present within voltage island 145 where it would be powered through power controller 140. Even power controller 140 may be disposed outside of voltage island 145. Since preferred embodiments of the present invention employ hard wired (or equivalent) fuses, it is also preferred that fuses 135 containing keys 135A, 135b and 135C (see FIG. 2) are also disposed outside of voltage island 145. However, since hard wired fuse structures do not consume any significant levels of power, they may, if desired or convenient, also be disposed within voltage island 145. Nonetheless, FIG. 1 shows them disposed in their preferred location. It is noted that the so-called hard wired fuses referred to herein may be provided in several ways. For example, a controlled laser may be used to remove conductive materials to create a circuit structure which indicates either a zero bit or one bit entry in a key. The fuses may also be provided by circuit components which are susceptible to producing open circuit conditions upon the application of electrical power above a predetermined level (the usual meaning and origin of the word "fuse" in this context). Other permanent memory structures could also be employed but are less preferred because of their cost and/or size limitations. Power controller 140 receives power from two and only two external sources: regular power supply 170 and battery unit 175. The major function of power controller 140 is to insure that, should regular power supply 170 fail, power is still maintained from battery unit 175 and also to insure that if battery unit 175 and regular power supply 170 both fail, that no power is supplied to SRAM 132 which is volatile. It is the volatility of this memory unit together with the operation of power controller 140 that insures that certain attempts at chip tampering do not result in compromising the integrity of the encrypted information within tamper proof chip boundary 101.

The circuits contained within Coach device 100 also include fuses 135. These fuses are shown in more detail in FIG. 2. Fuses 135 are significant for providing desirable levels of security and functionality to the design, use and operation of the systems of the present invention. In particular, fuses 135 preferably comprise an array of physically altered areas provided during chip manufacture. While described herein as "fuses," primarily for historical reasons growing out of how some of these areas may have been created on other chips for other purposes, the fuses employed herein represent an array of bit positions that are permanently written onto the chip during its manufacture to store certain cryptographic key information. These keys are typically written onto the chip using a laser beam for writing the desired bit patterns for three significant key values: chip private key 135A, chip public key 135B and vendor public key 135C. See FIG. 2. These key values lie within protected tamper proof boundary 101 and also preferably lie within voltage island 145; however, it is noted that it is not essential that keys 135A, 135B and 135C be present within voltage island 145. In point of fact, fuses may be implemented as well in either EPROM or EEPROM technology.

Figure 3:
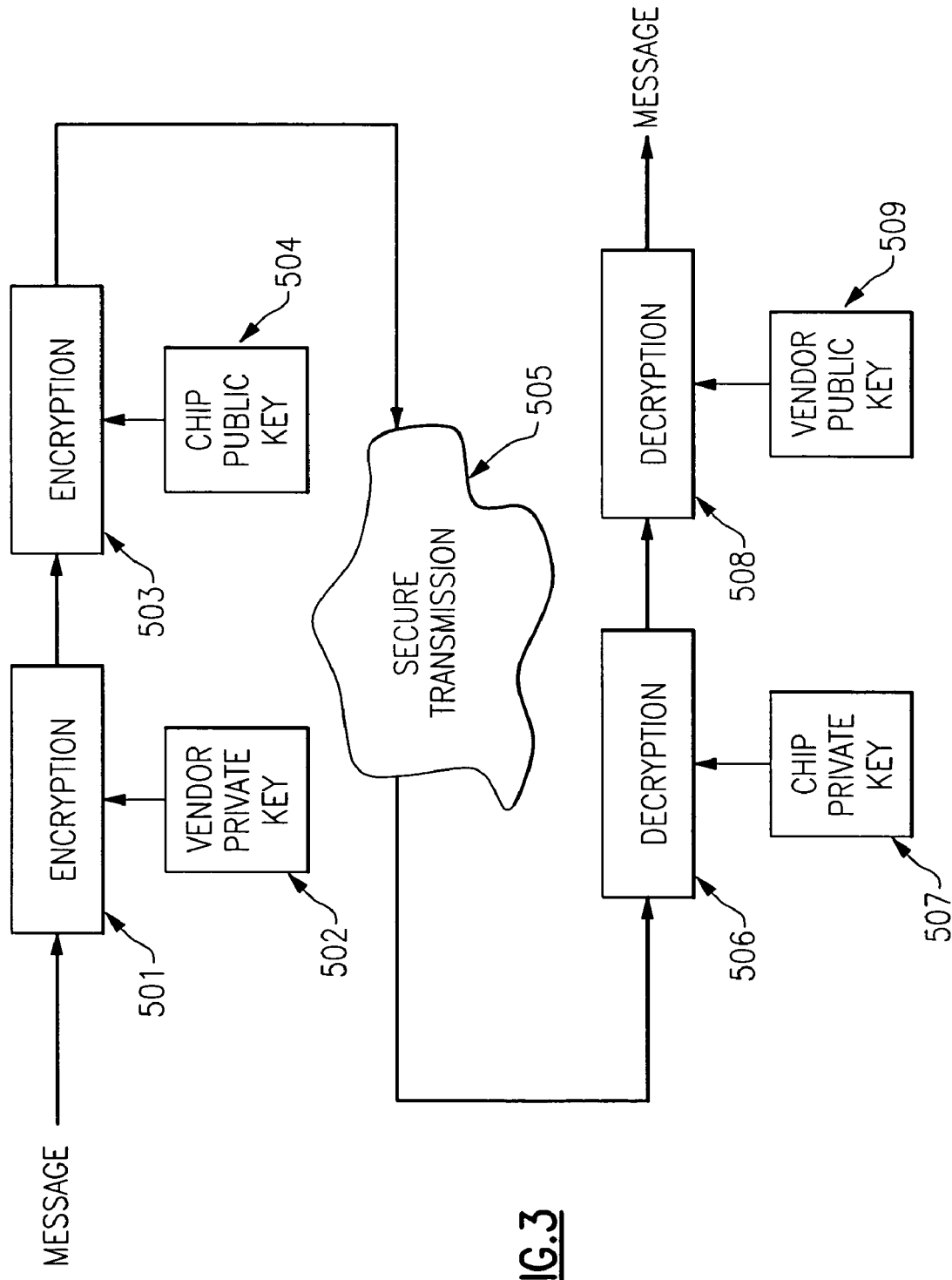
FIG. 3 is a process flow diagram illustrating the use of public and private cryptographic keys managed by two distinct entities, such as a chip manufacturer and a chip vendor, the chip vendor generally being the entity responsible for programming the chips FPGA components.

The keys stored in internally only accessible fuses are used like the key system employed in banks for access to a safety deposit box (except that here there is no opportunity for such things as drilling out the lock by the bank or for the use of a bank master key). In the typical safety deposit box scenario two keys are needed to open a depositor's safety deposit box: the depositor/client brings one key to the bank and a bank employee brings the other/bank key. Both of the keys need to be inserted to open the safety deposit box. The vendor public and private keys are analogous to the client's safety deposit box key; the chip public and private keys are analogous to the bank's safety deposit box key. These keys work together in a process such as that illustrated in FIG. 3. A message (any message, which is really any succession of bits with meaning attributable and known to its author and which includes executable binary programs) is first encrypted (step 501) using the vendor's private key 502. Note that this is the only one of the three keys employed which is not present as a fused area available as information bits to the circuits within chip 100. (Here the terms "public key" and "private key" are used in the cryptographic sense, and not with any sense that should be attributed to the safety deposit box analogy.) The encrypted message from step 501 is then encrypted again (step 503) using chip public key 504. This doubly encrypted message is thus rendered safe for transmission via any convenient path 505. This could include transmission via the Internet, via an intranet or other form of private network or by physically carrying or mailing a floppy disk or any other machine readable medium to a desired destination. Ultimately, however, the destination for this doubly encrypted information is chip 100 itself. This encryption method is very important to understanding both the structure and operation of the present invention and is also very important for providing an understanding of how its security aspects function.

It is important to note that chip private key 507 is present within the secure boundaries of chip 100 through the presence and use of fuse 135A; likewise vendor public key 509 is present within the secure boundaries of chip 100 through the presence and use of fuse 135C. Thus, totally within tamper proof boundary 101, there is present a mechanism for recovering the original message supplied as input to encryption step 501. The doubly encrypted message, arriving from whatever transmission path 505 is desired, is first of all decrypted (step 506) using chip private key 507. However, the information provided as an output from this step is not yet in a useful form. It is again decrypted (step 508) using vendor public key 509. Since vendor public key 509 and chip private key 507 are both available to on-chip circuitry, fully encrypted information may be passed through I/O interface 110 without fear for its security. Information transfer into the chip can thus be provided in a totally secure manner.

The above process is complete in those circumstances in which either a completely ASIC (that is, hardwired) implementation of flow control circuit 150 is provided or in those circumstances in which an already programmed FPGA is present. Accordingly, attention is now focused on this latter scenario, namely, how to assure proper and secure FPGA programming. In order to more fully understand this process, as set forth more particularly in FIG. 11, it is first important to understand the roles of chip vendor and chip manufacturer and to appreciate the process that is undertaken to (1) assure secure FPGA programming and (2) to assure secure loading of software, such as an operating system (or operating system kernel) into eDRAM 130. In general, the roles of chip manufacturer and chip vendor are considered herein, in the broadest scope of the present invention, to be distinct. However, it should be fully appreciated that the present invention also contemplates the scenario in which the manufacturer of chip 100 is also the vendor of the chip.

Figure 4:
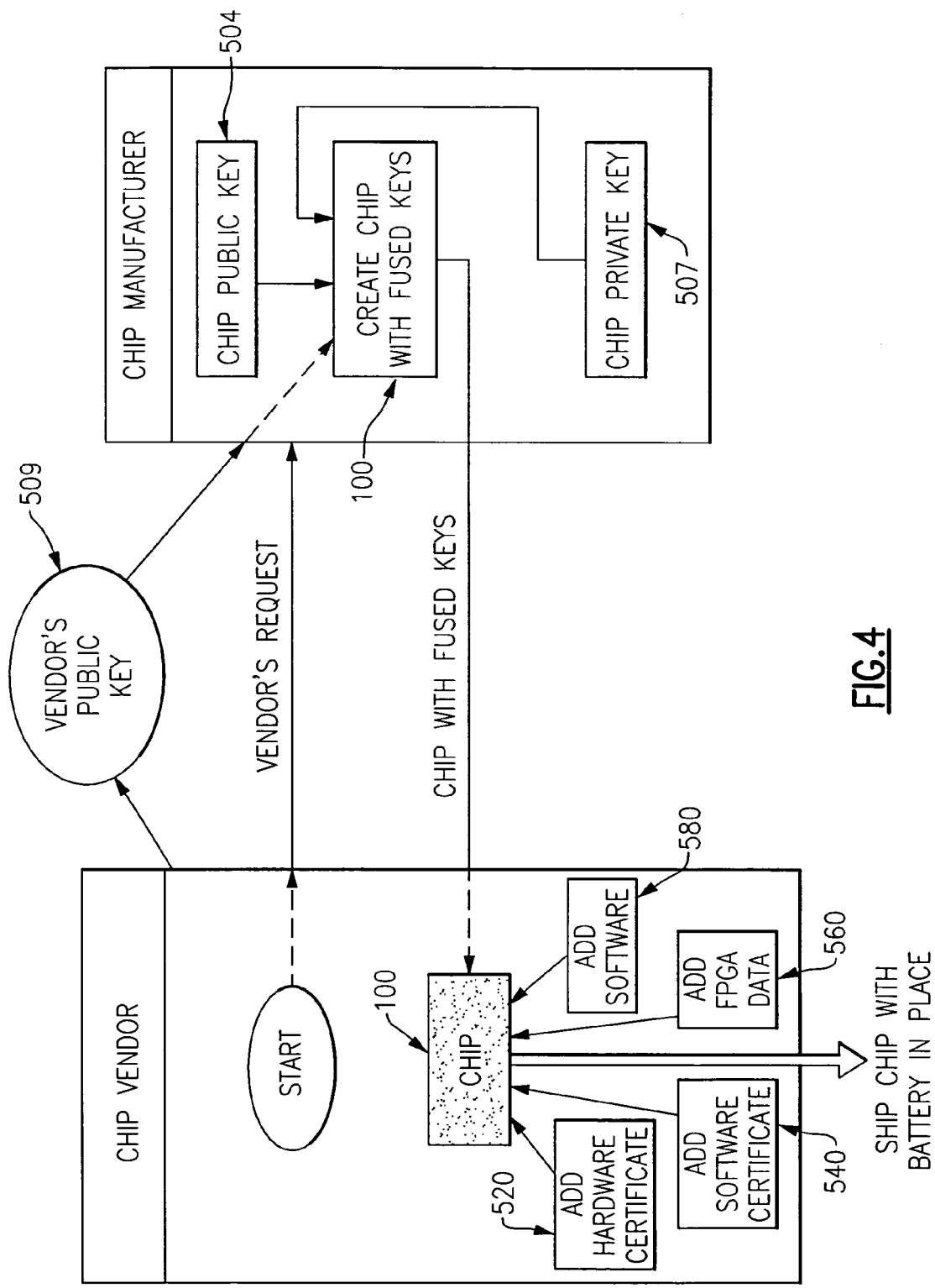
FIG. 4 is a block diagram illustrating the interaction of two entities involved in cryptographic (or other) chip production and marketing.

The process of getting to a fully programmed chip, having an internally secure FPGA component, which is "ready to function" is a multistep procedure and is conveniently separated into two distinct portions. A first portion of the process of producing a "ready to run" chip involves programming the FPGA component. A second part of the process involves loading secure programming within eDRAM 130. Furthermore, each of these processes is itself a multistep process which involves a certification subprocess. An overview of this process is illustrated in FIG. 4. FIGS. 5-10 illustrate the details involved in the subprocesses that are indicated in FIG. 4.

Apart from the posting of the vendor's public key 509, the process typically begins with a request by the chip vendor for one or more chips which are to be manufactured. In the typical scenario, all of the chips from a requesting vendor are manufactured with fuse 135C being encoded to represent the vendor's public key. The fuses themselves may be implemented in several different ways. They may be hardwired in the chip manufacturing process. They may be burned in after chip manufacture by laser or through the use of sufficiently high current pulses, much in the way that ordinary household fuses are "blown." Additionally they may also be provided by ROM, EEPROM or EPROM technology. EPROM fuses have the additional feature that their contents can be erased after usage is complete. The vendor is not limited, however, to the use of a single public key. This key is added to the chip during manufacture in a fashion which renders it possible to be "read" by the rest of the on-chip circuits, say by laser etching of circuit components. The chip manufacturer then adds his own set of two keys: chip private key 507 and chip public key 504 embodied as fuses 135A and 135B. Vendor private key 502 remains a secret to the vendor. Chip manufacturer private key 507 remains a secret to the chip manufacturer. The information as to which chip private key is on which chip is destroyed by the chip manufacturer as soon as the chip is completed. See FIG. 4.

The chip with the desired cryptography keys written onto it and lying within tamper proof barrier 101 is then shipped to one who desires to ship ready-to-function chips. The ready-to-function chips are preferably shipped out mounted on a desired board and connected with battery unit 175 in place to preserve SRAM programming until the card and chip are permanently disposed within a destination system, such as a data processor, server or network environment through which regular power 170 is provided.

Before any substantive information is delivered to the interior of chip 100, two processes are carried out to insure the presence in SRAM 132 of: (1) a vendor's certificate for loading FPGA configuration data and (2) a separate certificate for loading other secure programming data. There are thus two certificates loaded: a vendor's hardware certificate for the subsequent loading of FPGA configuration data and a vendor's software certificate for the subsequent loading of software such as an operating system. Clearly, the FPGA configuration must take place first prior to the loading of other information. In this respect it is important to note that so far only data has been generated for later loading at a customer site. Accordingly, batteries for data retention are not required at this point.

Figure 6:
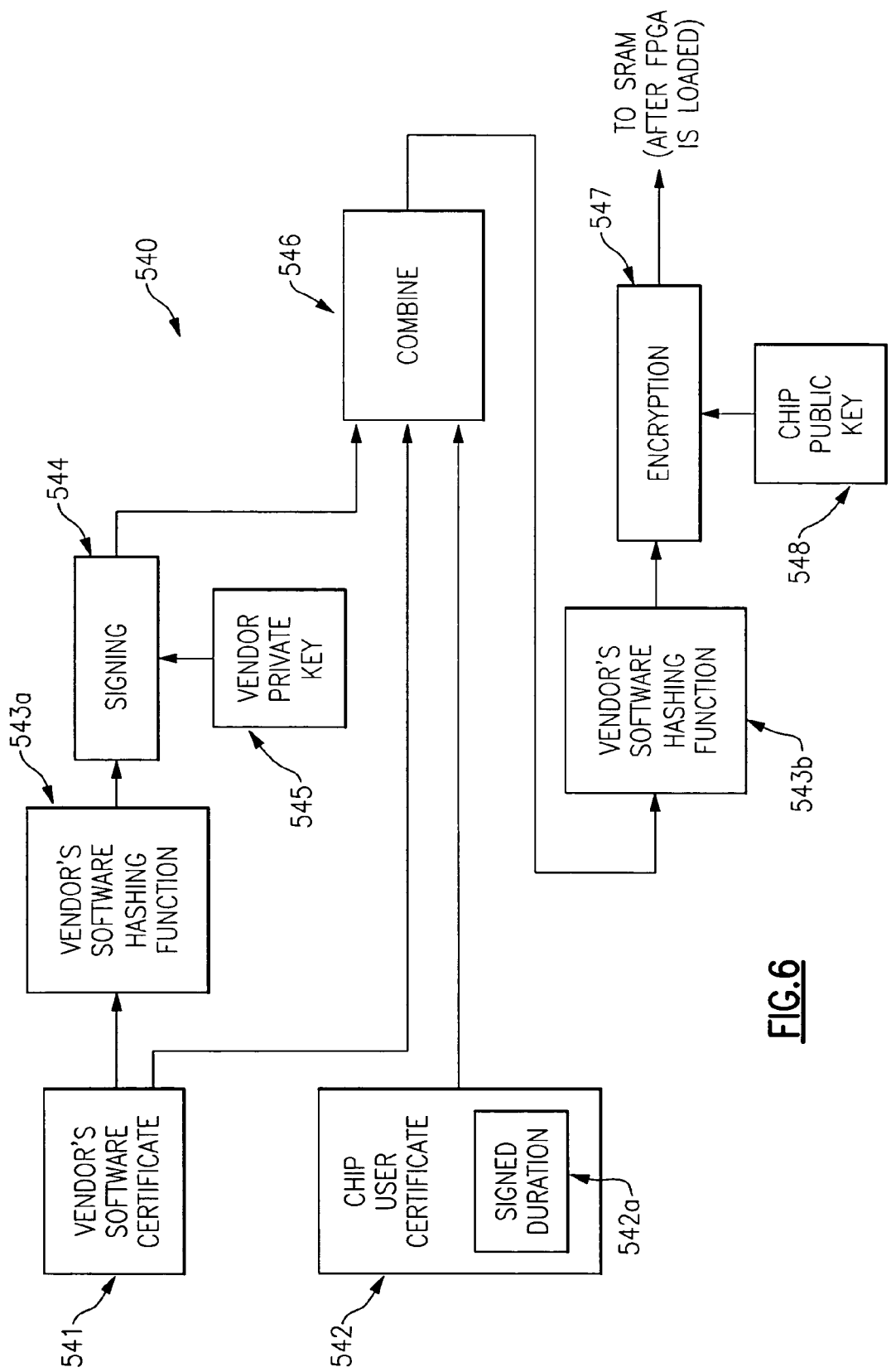
FIG. 6 is a process flow diagram illustrating a process for a vendor to use in order to provide a vendor's software certificate within an internal volatile chip memory to be used for verification and authentication purposes for establishing software operations within the secure boundaries of the chip.
Figure 7:
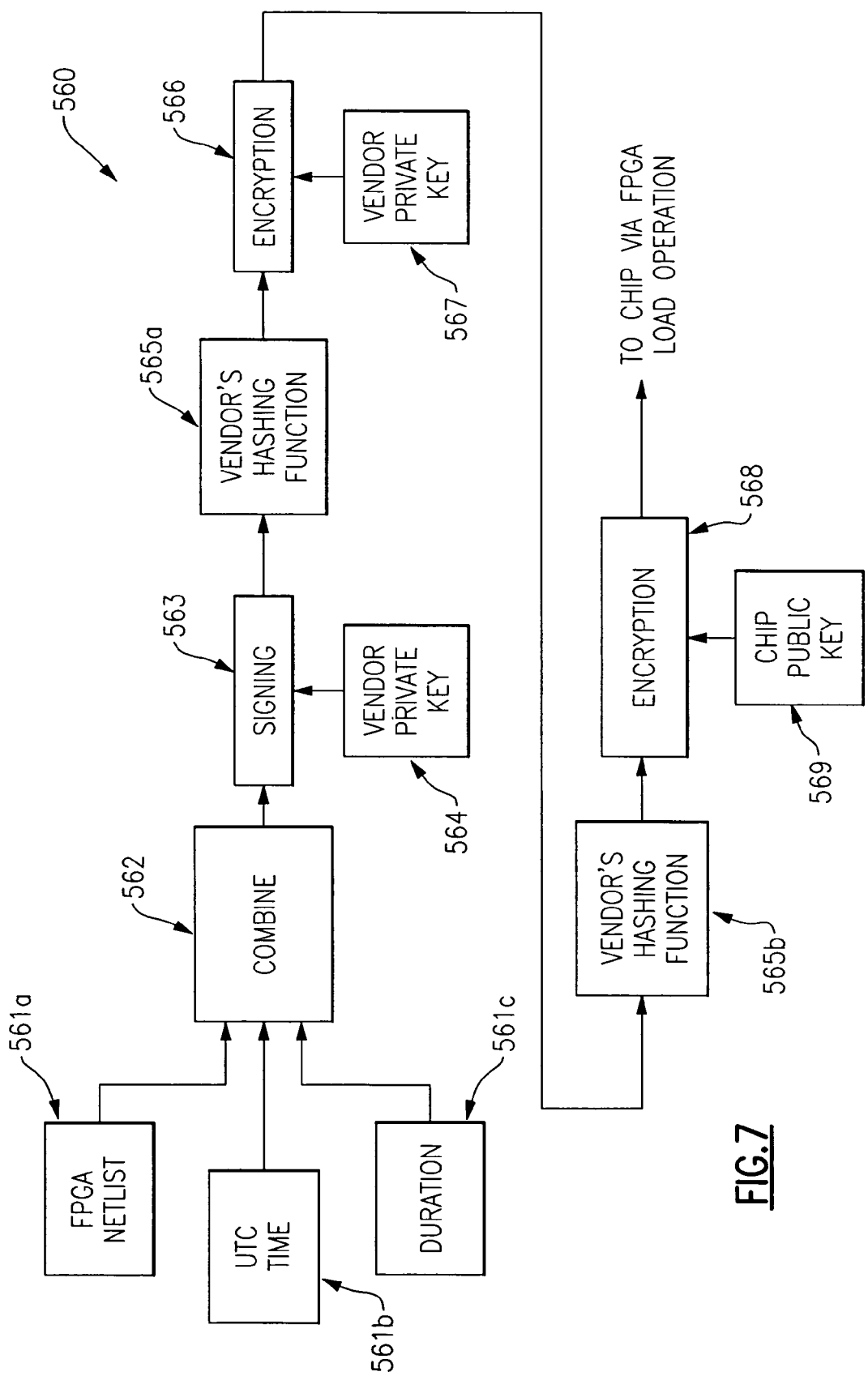
FIG. 7 is a process flow diagram illustrating a preliminary process for a vendor to use in setting up FPGA structural data which is used to configure the FPGA portion of the chip.
Figure 8:
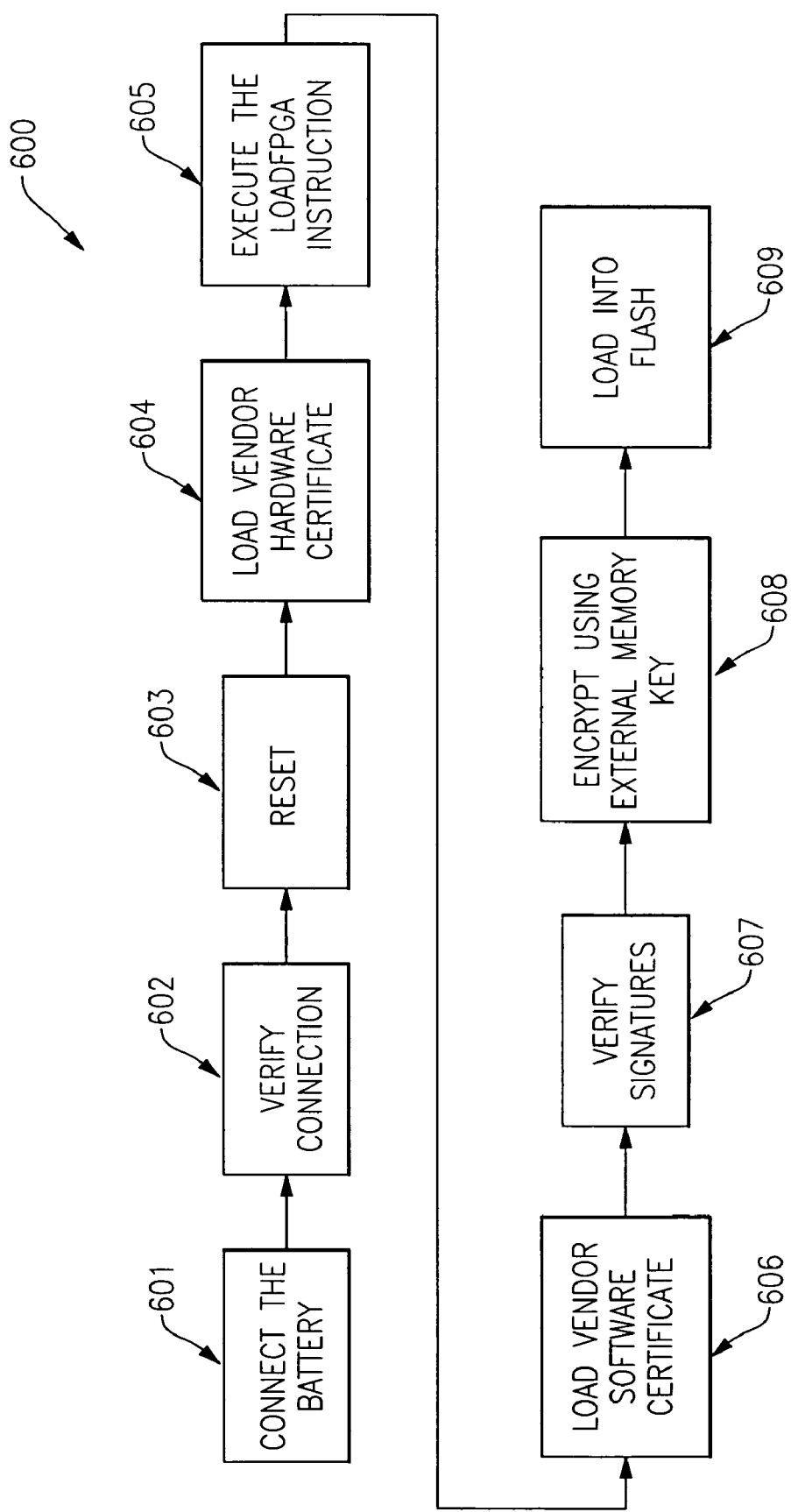
FIG. 8 is a process flow diagram illustrating the steps to be performed by a chip vendor to configure the FPGA portion of the chip.
Figure 9:
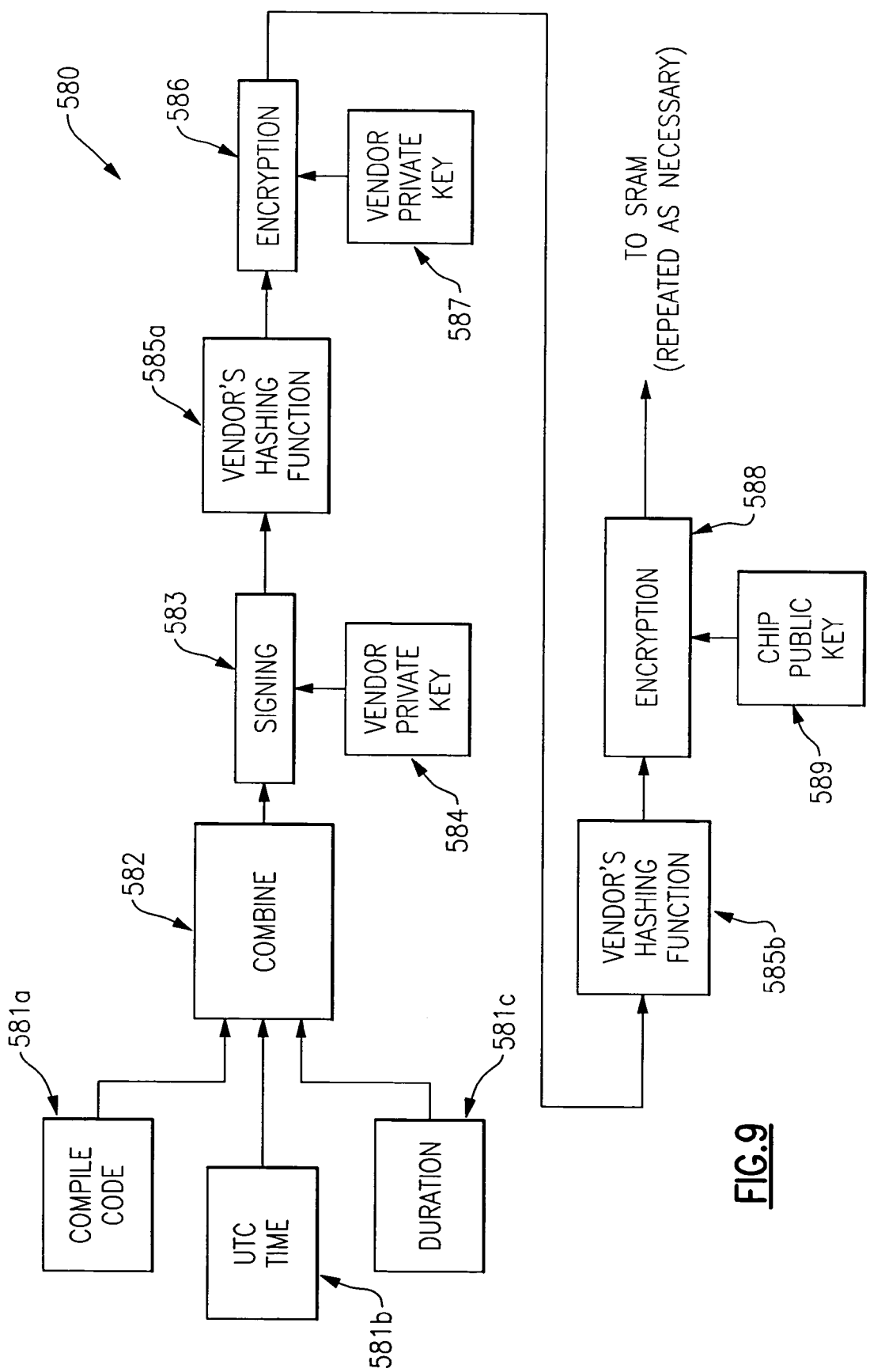
FIG. 9 is a process flow diagram illustrating the steps to be performed by a chip vendor to set up software which is to be used within typically nonvolatile portions of internal chip memory.
Figure 10:
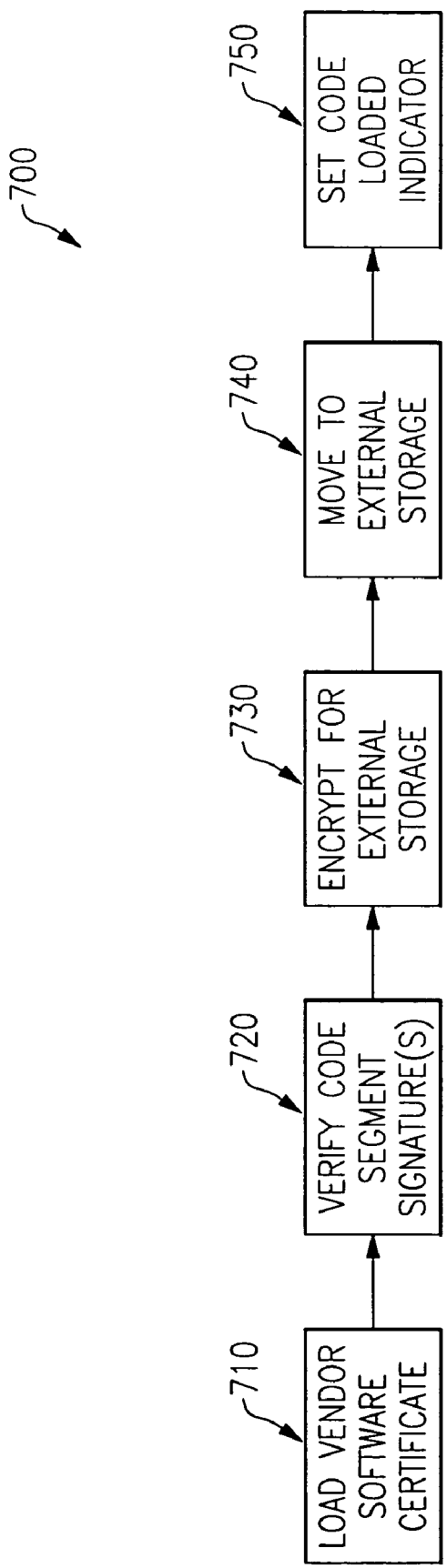
FIG. 10 is a process flow diagram illustrating the steps to be performed by a chip vendor to load the software prepared by the process shown in FIG. 9.

Once the certificates are loaded (see FIGS. 5 and 6), the information which is to be loaded is first prepared (see FIGS. 7 and 9). Finally, the desired FPGA data is loaded (FIG. 8) and then the software programming is loaded (FIG. 10). With the battery in place the chip is then ready to be shipped to the ultimate (end user) customer for use as a flexible, secure multi-engine cryptography processor, or as something else within the realm of processors. The details of these various steps are now described.

In this regard attention is again directed to FIG. 4. Once chip 100 is supplied to the chip vendor, the first step (reference numeral 520 in FIG. 4) is adding the vendor's hardware certificate (a set of bits used to verify the vendor's authority to make changes to FPGA 150B). If FPGA configuration data has been prepared and is available, it can be loaded now. Usually, however, the vendor also now loads into SRAM 132 (step 540) a vendor's software certificate (a set of bits used to verify the vendor's authority to make changes to internal, and therefore protected, memory units 130 and 132). Once these two certificates are loaded, and the information to be entered is prepared, the FPGA configuration data is loaded first (step 560) and then the software for use in eDRAM 130 and SRAM 132 is loaded next. In all of these processes it is, however, important to keep in mind that clear (that is, unencrypted) data never crosses the secure chip boundary. That is to say, the FPGA configuration data is specially encoded as also is any software to be loaded. The details of these processes are now described.

Figure 5:
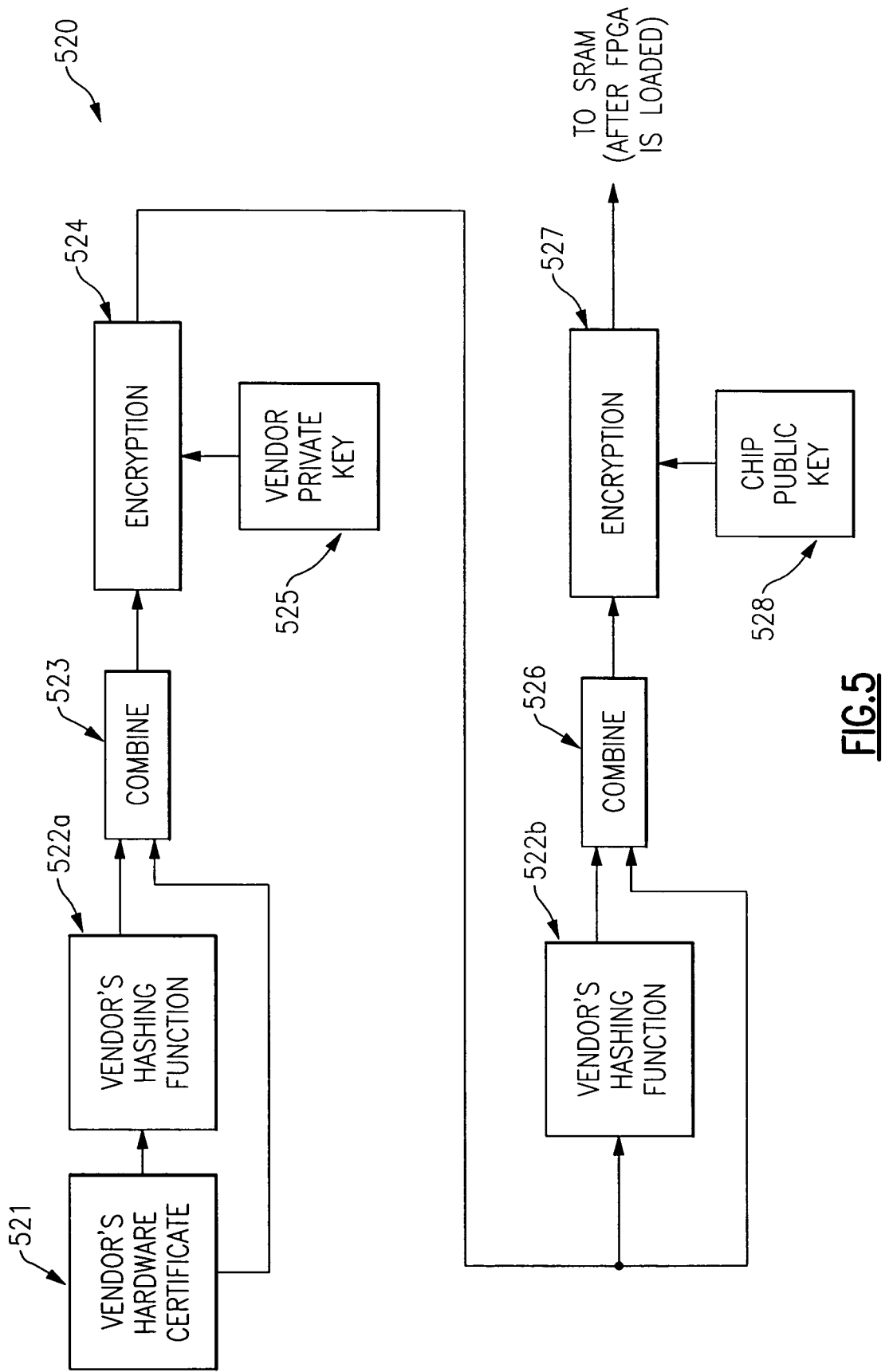
FIG. 5 is a process flow diagram illustrating a process for a vendor to use in order to provide a vendor's hardware certificate within an internal volatile chip memory to be used for verification and authentication purposes for establishing FPGA operations.

In particular, attention is directed to FIG. 5. The chip vendor employs a certificate process to ensure that only authorized changes are made to information present within secure chip boundary 101. This certificate is encrypted using the vendor's private key 525 in step 524. However, prior to this encryption step the vendor may employ an additional, optional duration activation step to support on-demand features that may be added to the system, where the feature activation codes are stored securely while activating a "nopath" mode by default. In the nopath mode, if the chip is on a system, by default there are no functions or paths that are activated for user use; rather functions are only activated for system usage or for feature code activation. This can apply to the resource asset management step by passing chosen certificate 521 through vendor's hashing function 522a. (See the discussion in the paragraph below for a general description of hashing functions.) The original vendor's hardware certificate 521 is then combined in step 523 with the hashed version of certificate 521. The combination that occurs in step 523 is preferably a concatenation of the two output bit sets (the original certificate plus its hashed version). The output from step 523 is then encrypted in step 524 using the vendor's private key 525. This encrypted output is then subjected to vendor's hashing function 522b and is combined with the unhashed version in step 526 which is also preferably a "combining by concatenation" operation. This hashing functions is, in general, the same hashing function employed in step 522a, except that it is applied to a different input bit stream. The output from step 526 is encrypted in step 527 using chip public key 528. The output from this step is supplied to SRAM 132. It is to be particularly noted though that the output from step 527 is preferably supplied to SRAM 132 through interface 110. However, before this is done it is understood that FPGA 160 (see FIG. 11) is programmed first through the invocation of the special purpose and limited "Load FPGA" command. Additionally, it is noted that, based on the enablement of external memory path 105 the FPGA may also be programmed to accept similar request blocks as through interface 110. The purpose of the process illustrated in FIG. 5 is the placement within SRAM 132 of encrypted indicia of authority for the purpose of subsequently permitting loading FPGA configuration data into FPGA 150B.

The inclusion of a nopath mode provides a significant advantage in terms of chip functioning. This special mode, as preferably implemented in the state machine logic of COACH flow control switch 150, provides a mechanism under which acceptable input to the chip includes only that information which enables the chip to be "turned on" or activated. Even more particularly, the use of this mode enables the chip to be enabled to perform certain functions and tasks to the exclusion of others. For example, the nopath mode permits the utilization of an authorization code that permits the chip to be operated for a limited period of time and/or for a specified duration. This mode also allows the chip to carry out certain operations and to forbid or deny access for others. For example, if the chip has been purchased for the purpose of cryptography using 1,024 bit keys, the chip can be precluded from carrying out cryptographic operations using 2,048 bit keys or 4,096 bit keys or any other key size. With the payment of additional fees however, the chip may be made to be fully capable of performing these operations. Furthermore, while the chip of the present invention was initially viewed as a secure cryptographic processor, the same chip may also be viewed as a general purpose processor or set of processors whose functionality in terms of time and capability is controlled in an authorized and limited fashion in which the cryptographic engines present of the chip are used to provide the requisite levels of authorization. Thus, the chip of the present invention becomes an "on demand" device. Furthermore, control of the uses to which the chip device is put is still under the direct control of the chip manufacturer. Nonetheless, the chip manufacturer still has the capability of passing along this level of post-manufacture and post-sale control to another business entity, if desired. In a sense then, the chip becomes a "leased device" with a controllable lease duration and extent, control of which may also constitute a separate salable item.

In general, a hashing function describes a process in which a message or other information to be transmitted is mapped into a sequence of bits. The number of bits in the message is typically intended to be many orders of magnitude larger than the number of bits that are produced as output from the hashing function. The mapping is such that virtually any change in the bit content of the message is almost assuredly guaranteed to produce a change in the output of the hashing function. This provides assurance that, if there are any changes made to the message, this will show up in a mismatch between the original hashing function output and the new output from the hashing function. The hashing function output is commonly referred to as the message digest. Many different hashing functions are known to be able to achieve desirable levels of security. The present invention is, however, not limited to the use of one hashing function or another, just as long as they are used consistently. Some of the FIPS standards referred to above also include descriptions of acceptable hashing functions. For example, in FIPS Publication 180-2, dated Aug. 1, 2002, there is a description of what is referred to as the Secure Hash Standard (SHS) which specifies four Secure Hash Algorithms (SHA): SHA-1, SHA-256, SHA-384 and SHA-512.

A similar process 540 is also carried out for the purpose of placing within SRAM 132 an encrypted indicia of authority for the purpose of subsequently permitting loading software, such as an operation system and/or its components, into SRAM 132 and eDRAM 130. This process is illustrated in FIG. 6. It is noted, however, that this process, while similar to the process illustrated in FIG. 5, is particularly different in that it includes a mechanism for incorporating an encrypted time and date. This information may be used to provide time limits for the operation of the chip. As such the chip may be licensed for use for a given duration or for a set period of time between two dates or times. It is noted that this is an optional feature of the present invention. In operation a fully configured chip is supplied with a certificate of authority. This certificate may include time limitations or other indicia for controlling access to processing functionality provided on the chip, either in the form of processor 115 or in the form of cryptographic engine(s) 195. For purposes of the present invention, a certificate of authority is any digital indicia provided to the chip whose purpose is comparison with already encoded internal data with an appropriate match meaning that there is a grant of chip access to some level of chip functionality. This level of functionality access is directed both to temporal grants of permission and to grants of levels to performance and security, such as with the grant of permission to use a cryptographic key of a specified length. If necessary, a supplied certificate of authority is first decrypted using engine(s) 195 before it is compared with the data supplied to SRAM 132.

As one of the steps shown in FIG. 6, chip user certificate 542, which preferably incorporates a signed "duration" indication is combined with other information in step 546. The use of chip user certificate 542 provides a mechanism for controlling at least one optional aspect of the present invention, namely the ability to grant authorization for use for a defined time period or for a defined time duration. This certificate is thus usable to activate the system and/or to grant use of the system for performance of certain functions, such as cryptography, while simultaneously denying authority for other operations. In short, authorization may be selective in addition to being temporally controlled as well. User certificate 542 provides the proper indicia for this authority. While indicated as a duration, this indicia may also include beginning and end time and/or date indications. It is signed using the vendor's private key. The other information supplied to combining step 546 includes vendor's chosen software certificate 541. Certificate 541 is also processed through vendor's software hashing function in step 543a. This is preferably different than the vendor's hardware hashing function employed in the process illustrated in FIG. 5. The hashed vendor's software certificate is signed in step 544 using vendor's private key 545. The output from step 544 is combined with vendor's software certificate and also with chip user certificate 542. The combination is preferably by a simple concatenation. The output from combining step 546 is processed using vendor's software hashing function in step 543b, which may or may not provide the same hashing function as in step 543a. The output from step 543b is encrypted in step 547 using chip public key 548. As in the process shown in FIG. 5, the output is then supplied to SRAM 132.

A significant aspect associated with the high level of security provided by the chip of the present invention is that only encrypted data passes through interface 110. Accordingly, configuration data used to provide programming structure to FPGA 150B is encrypted before it is supplied to chip 100 through interface 110. The preferred process for carrying out this encryption is illustrated in FIG. 7. As with the vendor's software certificate, it is also possible to incorporate beginning and end time constraints and/or duration constraints into the operation of the chip and its components, such as FPGA 150B. As is well known, the structure of a programmed FPGA is provided in what is called a net list (also referred to as a "netlist"). Desired net list 561a is combined in step 562 with time indicator 561b (preferably provided in a coded form of universal coordinated time (UTC)) and with optional duration indication 561c. Again, the combining step is preferably a simple concatenation. The signed certificate (using the vendor's private key is passed through hashing function 565a and is encrypted in step 566 using vendor private key 567. The output from this step is passed through vendor's hashing function 565b and is then encrypted in step 568 using chip public key 569. As with the processes discussed above, the use of hashing functions is optional, but still very much desired to achieve the utmost in data security and integrity; moreover, each may or may not be different than the others. The output from encryption step 568 is supplied to chip 100 through interface 110 through the use of a special "LOAD FPGA" command whose operation is more particularly illustrated in FIG. 11 which is discussed herein in detail further below. Thus, it is seen that there is provided a process 560 for preparing FPGA configuration programming data prior to its transmission across secure chip boundary 101.

An overview of insertion process 600 for FPGA configuration data is shown in FIG. 8. It is first insured that the battery or other power supply is connected to chip 100 (step 601). Recall that in the absence of power, volatile SRAM memory 132 is erased. Next the power connection is verified in step 602. This is generally accomplished through the execution of an "on answer" command. As another example of how power connection is verified, this may be accomplished during the powering up process at which time voltage is applied to a phase locked loop (PLL) and to a reference clock which is generated from an oscillator. The locking of the PLL indicates a valid clock signal. At this point in time a hardware signature is generated by scanning data in and by verifying that the data scanned out matches the expected output for the data scanned in. The expected output is then typically compared against data stored in an internal EPROM. It is noted that this process is a standard operation commonly employed in microprocessors and similar circuit devices. A reset operation is then performed to insure that ASIC circuits 150A are in a proper initial state (step 603). In this regard, it is noted that a state machine design is typically employed in which there is provided a mechanism for the receipt of a special reset signal that takes the state machine into a well defined "init" state. Next the vendor hardware certificate is loaded into SRAM 132 (step 604; see FIG. 6). Next (step 605) the LOAD FPGA command is executed (see FIG. 11 and the discussions related thereto). Next (step 606) the vendor software certificate is loaded. The chip then internally verifies the signatures (after decryption using internally available keys; see FIG. 3). Next (step 608) the output from step 607 is encrypted using an external memory key and loaded into flash memory. In this regard, it is noted that when the chip is powered up for the very first time after manufacture, all of the data is encrypted under hard coded keys. These keys are used by the onboard cryptographic engines to encrypt and to decrypt data whenever necessary. The resulting data is encrypted under the ephemeral key stored in Battery Backed up SRAM 132 (BB-SRAM). The use of ephemeral keys in SRAM 132 not only enables the COACH system to have faster power up, but it also provides added security in case of physical attacks. On a second boot up operation, the FPGA data (that is, the netlist data that programs the FPGA) resides in an encrypted form in external memory 210. It is noted that this FPGA data is safely loaded into external memory using the battery backup. It is noted that this information is protected, not by keys initially stored in the on-chip fuses but rather on later, by independently provided key information. In operation, tampering with the present COACH device destroys any internally stored keys and thus makes the external memory useless. Thus, secret information is maintained as secret information, even if the card containing the COACH device is pulled from its system (or system level board). The presence of this encoded information provides two significant advantages: (1) it provides an additional indicator that the battery backup is functioning; and (2) it avoids the need to reinitialize the chip with FPGA data using the original manufacturer delivered data.

In addition to having a process for preparing FPGA configuration data to be loaded, there is also a corresponding process for preparing software to be loaded into chip memory in a secure fashion. As with the loading of FPGA configuration data, preparation involves encryption. The desired process is illustrated in FIG. 9 which is virtually identical to the process shown in FIG. 7 for the preparation of FPGA configuration data. The caption in FIG. 9 refers to "forming" since the term "compiling" has other meanings when applied to software. For example, the first step in FIG. 9 is a step of "compiling" the software, as that term is usually applied to a process in which code is converted into a so-called binary or executable format (step 581a). Apart from that initial distinction, the process of FIG. 9 proceeds in the same manner as the process of FIG. 7 described above. And, as with the process of FIG. 7, the inclusion of time and/or duration information is optional.

Attention is now directed to the next stage in the utilization of the COACH device in which the loading of hardware code (that is, FPGA programming) and software code is performed for the very first time. For subsequent situations, the initialization process is simpler as described below. However, the present discussion is nonetheless focused upon the very first time the manufactured chip is loaded with hardware (FPGA) data and software. The battery or batteries are first connected, if that is not already the case. Battery connection is verified by checking the voltage on the pin that connects to the external power supply. If the battery is not connected and/or if there is insufficient voltage present on the subject pin, then any keys stored in SRAM 132 are lost. In this case any data present in external memory 200 is also "lost" in the sense that it becomes locked under an unavailable key. Clearly, under these circumstances no hardware or software code is loaded and the chip is back at the stage where hardware specific FPGA code is to be provided. If such a failure is accompanied by evidence of physical tampering, then the chip is preferably discarded. To the extent that this process is automated, a low voltage or no voltage signal preferably results in providing a warning given to the user that no battery is hooked up and data will be lost on power down. This may be accomplished through a bit accessible to the system software layer. A bit stored in the voltage island is used to indicate tampering; this bit is not only useful for detecting a tampering event but is also useful for indicating that the batteries are not attached. This bit is contained within status register 134 shown in FIG. 2 within voltage island 145. When the chip is powered up, all of the components outside of the voltage island are reset. The information within the components on the voltage island is, however, maintained by battery unit 175 or by regular power supply 170. A signature within SRAM 132 indicates whether or not the chip is reset. This is an initialization signature which is loaded into SRAM 132 on first power up. If chip 100 is reset that means that voltage island 145 is initialized and if it is initialized, status register 134 is read using an internal address. In this regard it is noted that it is not necessary that the entirety of this register be present on voltage island 145; some bits in battery backed-up SRAM 132 that are part of the status register do not have to be on the voltage island. Status register 134 is present within voltage island 145 and also contains a bit indicative of tampering which is a value maintained at all times past the first initialization. When chip status is requested, a tamper bit is one of the bits provided; if it is set (based on the active value), it indicates a tampered or not-tampered status. Another bit is initialized to indicate whether or not the battery is connected.

If all goes well with the battery test, the chip is reset. In a chip reset operation, all of the components are preferably reset except for those on voltage island 145. The reset is carried out through the operation of the state machine upon which flow control circuit 150 is preferably based. After reset the hardware vendor certificate is loaded as the first step in the operation of the Load FPGA instruction. In a second step, in which FPGA data itself is loaded, the vendor hardware certificate is employed to make sure that the FPGA data matches the vendor's hardware certificate. However, the first time, the hard coded values in the eFuses are used to decrypt the data, and for each "powering up" after that the public key certified by the certificate is used to control access. Recall that, as shown in FIG. 5, this certificate is encoded using the vendor's private key which now insures a secure match. Once the Load FPGA instruction loads the vendor's hardware certificate into SRAM 132, the information in this certificate is used to decrypt the FPGA data which is then loaded into FPGA portion 150B of flow control switch 150. This insures that only an authorized vendor is permitted to modify the FPGA data. During the next stage of the Load FPGA instruction the vendor's software certificate, which has either been previously or is concurrently loaded via the Load FPGA instruction (see step 710 in FIG. 10), is used to decrypt and/or to verify (see step 720 in FIG. 10) software which is thereafter preferably stored in eDRAM 130 in an unencrypted form for use by processor 115. In the process contemplated for the vendor's software forming process FIG. 9 illustrates a more inclusive process in which the software is encrypted as well as being only hashed and signed. However, it is noted that the encryption related steps (586, 587, 588 and 589) are optional. Based on the desired level of security, there are thus two options. In the first option, the software is merely hashed and signed, thus keeping source code available thus resulting in a sped up of memory operations. Nonetheless, for added security, in a second option, the encryption related steps are employed as well as the other steps illustrated. This software typically includes some form of operating system or operating system kernel.

Figure 11:
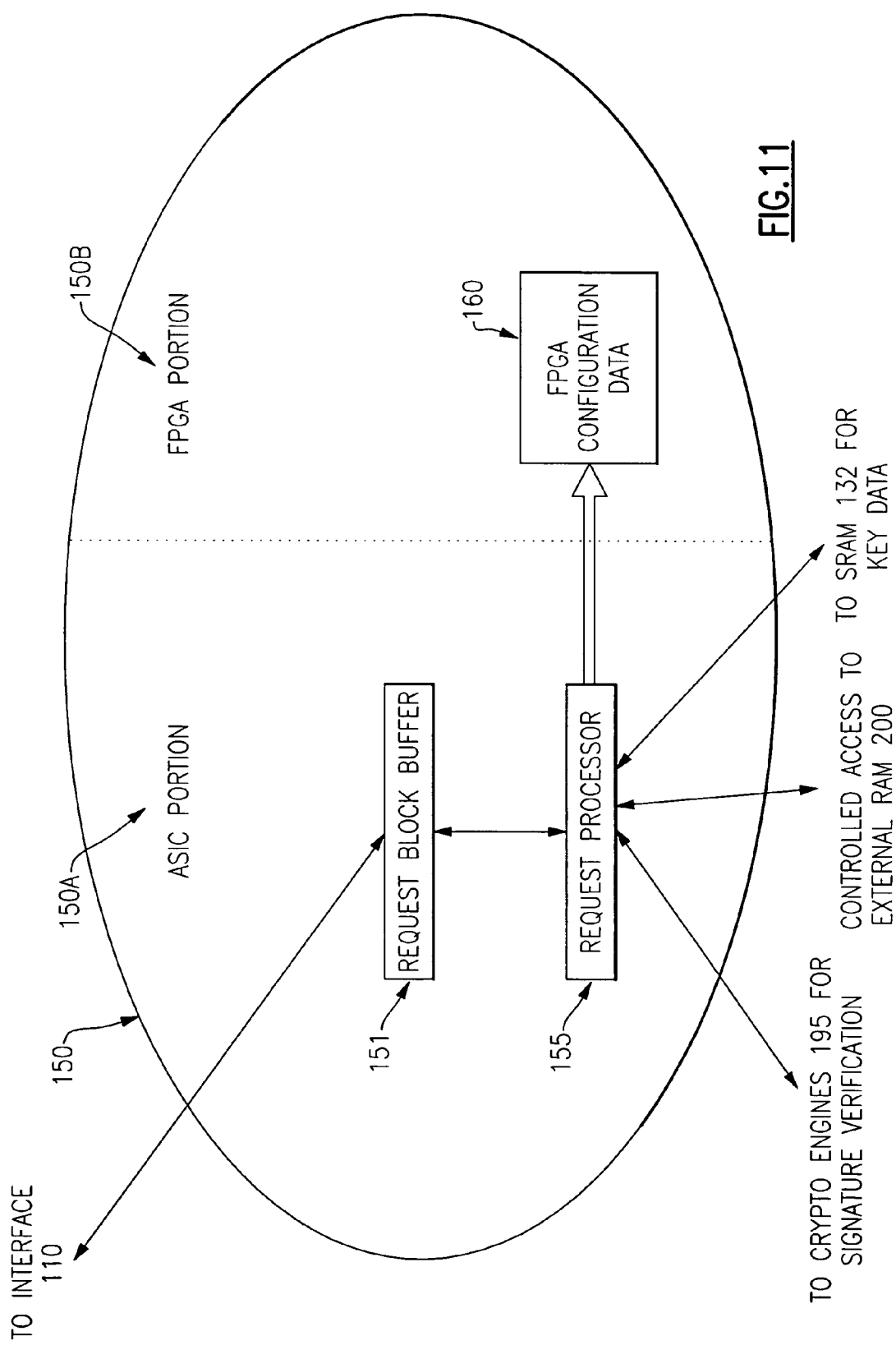
FIG. 11 is a block diagram illustrating one aspect of the combined ASIC and FPGA functional components used to provide flow control for data and commands received through a secure external interface.

The special purpose LOAD FPGA instruction is executed by supplying a specially recognized command, through interface 110; this command is recognized by request processor 155 in FIG. 11 which is implemented in ASIC hardware portion 150A of switch 150. As described above, this command includes key information which is selected to be compared with the previously stored hardware vendor certificate. If the comparison is successful, netlist data for programming FPGA portion 150B is permitted through interface 110 and is used to program FPGA portion 150B. At this point FPGA portion 150B of flow control switch 150 is now programmed. FPGA data is volatile and is protected via the use of the Load FPGA instruction, as described above, which requires proper cryptographic keys for access.

Once software in unencrypted form is present in eDRAM 130, it is preferable to also encrypt it (see step 730 in FIG. 10) and to load it (see step 740 in FIG. 10) into secure portion 210 (see FIG. 12) of external memory 200. This is done using the external_memory_key (See reference numeral 135D in FIG. 2). The external_memory_key is provided in the same fashion as fuses 135. One employs this information as a hard coded key, just like the other fuses. At the first time of use, any data that is shipped as part of the external memory is encrypted under the external_memory_key. The data is then decrypted and loaded internally, and encrypted again under a newly generated key and stored in external memory 200. Once code has been successfully stored in eDRAM 130, the state of a code_loaded register is set to indicate this status (see step 750 in FIG. 10). This register is preferably contained in a bit in status register 134 within voltage island 145 like the tamper bit discussed above. In variant embodiments status register 134 could be made part of SRAM 132.

The loaded software preferably includes a signature for each device driver loaded. While the software is stored in eDRAM 130 in unencrypted form, it is also desirable to store an encrypted copy of the contents of eDRAM 130 (or portions thereof) in external memory 200. Having this information stored there provides a convenient location for a "reboot" operation. One still loads the FPGA on every boot up, but at least you don't have to reuse the enablement diskette anymore; and it is more secure since, if tampering is detected, one uses the diskette to reinitialize the whole chip. The enabling diskette contains enabling software which pertains to the different protection layers generated earlier and which is encrypted under hard coded keys, that is, under keys implemented as fuses. This is like having a key to your own safe. Safe transfer from internal to external memory 200 is provided through external memory interface 105 which preferably works by securely controlling access to a limited set of addresses in memory 200.

As promised above, attention is now focused upon subsequent loadings of hardware (FPGA) and software information. In the process described above for the very first loading operations, it is generally assumed that the battery was not initially connected and/or that it was otherwise known that the very first load operation was to be performed. However, for subsequent load operations, it is first desirable to check the status of the code_loaded register. This is done by reading the battery_backed_up bit in status register 134 within voltage island 145. This bit is stored on voltage island 145 and is retrieved as described above with respect to addressing and accessing status register 134. If the register indicates that code is loaded and if there is no indication of error, then the operation proceeds by enabling the hardware by loading FPGA data from secure external memory portion 210. However, if tampering is detected or there is a hardware error or the battery or memory have failed, an error indication is provided in status register 134. This error indication is provided by means of status register bits which, by virtue of the register's presence on voltage island 145, are backed up battery 175, as needed. The contents of status register 134 is read by the chip internal software and is preferably reported to the operating system running in eDRAM 130 during its boot up operation and thereafter as well. Status register 134 is accessed by specifying its unique address or by executing a command or a read operation. Additionally, if the verification of the external encrypted memory doesn't vary the signature, the same mechanism is used to report the error. After FPGA data is loaded all of the segments of an operating system (or any other desired software) are retrieved from secure external memory portion 210, decrypted and stored in eDRAM 130. The chip is now ready to load the upper-level memory segments. The notion of a memory segment is described in the publicly available document titled "IBM 4758 Model 13 Security Policy" dated November 1999. For the present purposes, it is pointed out that segments 0 and 1 are memory portions into which booting code is inserted. This includes such things as miniboot, miniboot 0 and POST (Power-On Self-Test) code. Segment 2 is provided with Operating System (OS) level code. Finally, segment 3 contains application level programming.

Attention is now directed to the use and operation of real time clock 133 present on voltage island 145 (see FIG. 1). This is a hardware clock which is resettable in a secure fashion. It is usable in conjunction with time based authorizations for the use of all or portions of the chip's functionality. For example, this clock may be used to control either the duration of chip use or be used to lock in a particular start time or end time. As used herein, this clock refers to time that is quantized into any convenient period. It may be measured in days, weeks, months, years or nanoseconds and is limited only by the frequency of the clock/oscillator that is used in its hardware implementation. Once the chip is initialized there is a potential problem with feature activation for certain period of time. Validating the initial time set in real time clock 133 is an important step in minimizing this problem. In order to better facilitate the use of real time clock 133, it is desirable to also include a status bit in status register 134 which is set when clock 133 has been set in a secure manner. However, it is noted that, from within the chip itself, it is hard to determine whether or not clock 133 has been properly set.

To prevent use at unauthorized times or for unauthorized durations, a register within clock 133, which is used to store the current time and date, is controlled so that it may be changed only via a secure mechanism. There are several ways that this may be done. The easiest approach is to simply read the system clock of the system in which the chip is installed. The process of clock setting is preferably established using the host system for the COACH device and COACH chip device drivers. However, since the system clock is not a considered to be a sufficiently secure source of time information, this is not the desired approach for most applications, although for some limited purposes it may be acceptable, even if only temporarily so. In particular, a system clock may be set to a very early time setting so that the active period becomes longer and the chip manufacturer's rights are not protected. Accordingly, the preferred approach is to retrieve a signed time stamp from an agreed upon and/or certified server. At this point any applicable monetary charges may be assessed and processed. Once the hardware is installed, registration of the hardware is carried out; at this point in time, the actual current value indicated by real time clock 133 is set by means of encrypted message (which is an activation code). It is noted that in almost all situations minor delays in requesting time information and inserting it into real time clock 133 are well tolerated by the system.

Clearly, from FIG. 1 it is seen that flow control switch 150 plays a central role in the structure and operation of chip 100. The term "flow control switch," while being a convenient phrase to use for the discussion herein, is only partially descriptive of the functions that this block performs. While block 150 functions primarily as a hub for receiving data and commands and for routing relevant information to the other components on the chip, it includes a command processor mechanism for interpreting commands and for initiating steps to assure command completion together with notification of completion and/or completion status. In particular, switch 150 includes request processor 155 which interprets command portions of request block buffer 151. Buffer 151 should not be considered to be limited to the role of buffering only small numbers of characters or bits. It is preferably sized to hold relatively large portions of data destined for SRAM 132 or for eDRAM 130. Request processor 155 is coupled to one or more cryptographic engines 195 for those circumstances in which encryption and/or decryption is desired.

Figure 12:
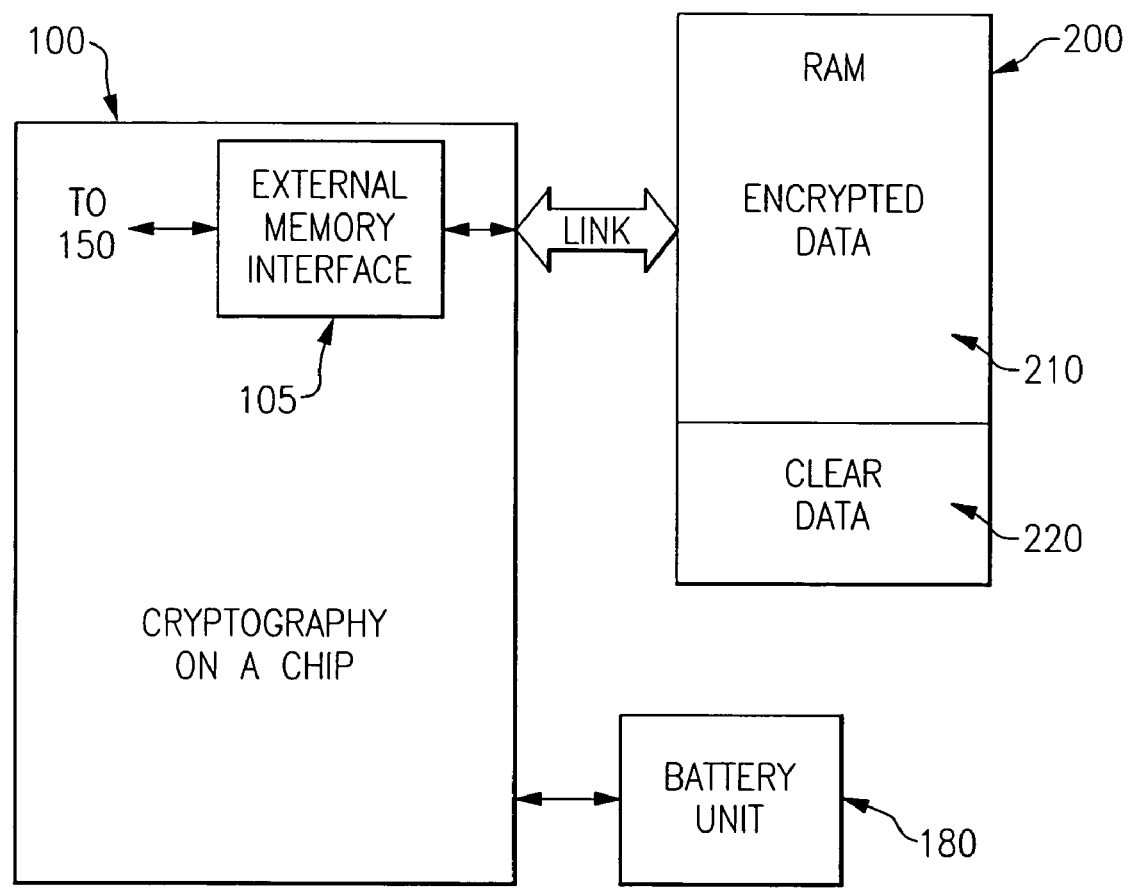
FIG. 12 is a block diagram illustrating the system of the present invention employed with a single external memory unit which, because of wholly contained security mechanisms can be safely divided up, from the same physical memory, into encrypted and unencrypted portions.

Processor 155 also provides secure access to external memory 200 (see FIG. 12). Note that here, the term "external memory" refers to memory that is not contained within secure chip boundary 101; it does not refer to eDRAM 130 or to SRAM 132 which are external in the relative sense to any memory that might be present as part of any embedded processor 115. Even more particularly, processor 155 acts to secure a portion of external memory 200 and to restrict its use to the storage of encrypted information (portion 210 in FIG. 12). This is preferably done through control of addresses. Processor 155 compares supplied addresses, for accessing external memory 200, with address ranges that have been previously set up as defining address boundaries. This is done through the establishment and use of an address mapping table that resides in SRAM 132 which contains keys and signatures to access different portions of the memory. It is transparent to the software. In particular, when an address is sent for a read or write operation, a key and a hash value is sent along with the address. Controls for confirming authority to access the address are implemented in flow control switch 150 and preferably within programmed FPGA hardware. Based on the address range being accessed, the key use is totally transparent to the operating system within eDRAM 130. These keys are only internal keys. They are erased upon tamper detection. The hash values are generated internally as well. This is one of the many flexible and adaptable properties of the present invention.

Processor 155 also has access to SRAM 132. It is in this volatile memory that cryptographic key information is stored. The key information stored in SRAM 132 is, however, not simply stored therein. The processes described above are employed. These processes make use of the chip private key, the chip public key and the vendor public key all of which are present within chip fuse area 135 (see FIG. 2). The use of a vendor private key makes secure insertion of information into SRAM 132 possible. The use of these keys also makes it possible to securely and more rapidly insert unencrypted data into SRAM 132. In general, SRAM technology provides faster access but it is not packageable as densely as eDRAM memory 130. Accordingly, one of the significant reasons for including eDRAM 130 is to contain chip size thus to reduce chip cost.

From the above it should be appreciated that the use of securely programmable FPGA components provides significant flexibility and, in particular, allows upgrades to the hardware by adding functionality and patches that are not currently in use. It also enables a method of providing fixes for hardware that is already in the field without adding the cost of redesigning and remanufacturing an entirely new chip. It also enhances the range of application software that can be run.

In normal operation a request block is sent to processor element 100 via interface 110. Request processor 155 returns a reply block via this same interface. The reply block typically contains an indication that an operation has completed successfully. However, the reply block can also contain an indication that the processor has failed in some way or that there has been a possible attempt at tampering.

The invention above has been described in terms of using FPGA's as the device of choice in constructing COACH devices and related systems. However, it is noted that the present invention also contemplates the use of any other programmable circuit devices, such as PLD's (Programmable Logic Devices). Furthermore, while the description above refers to the use of PowerPC microprocessors for use as embedded processor 115, it is noted that any microprocessor may be employed for this purpose, including the line of Intel microprocessors.

In some of its aspects, the present invention refers to the use of cryptographic engines to provide cryptographic functionality. This functionality naturally includes the processes of encryption and decryption. However, it should also be appreciated that these engines are capable of carrying out other functions related to cryptography and to modular arithmetic operations such as modular addition and subtraction, modular multiplication, modular division, modular exponentiation and calculations relating to the use of the Chinese Remainder Theorem.

While the invention has been described in detail herein in accord with certain preferred embodiments thereof, many modifications and changes therein may be effected by those skilled in the art. Accordingly, it is intended by the appended claims to cover all such modifications and changes as fall within the true spirit and scope of the invention.

What is claimed is:

1. A method for controlling access to a processor present on an integrated circuit chip, said method comprising:
supplying an encrypted certificate of authority to said chip;
decrypting said encrypted certificate of authority using at least one on-chip cryptographic engine; and
granting access to said processor based on said decrypted certificate of authority which is matched against data stored on said chip in a volatile memory also contained on said chip.

2. The method of claim 1 in which said processor is provided by a microprocessor on said chip.

3. The method of claim 2 in which said processor is provided by programming stored in an on-chip memory other than said volatile memory.

4. The method of claim 1 in which data confirming authenticity for said certificate of authority is stored on said chip in an encrypted form.

5. The method of claim 1 in which data confirming authenticity for said certificate of authority is stored on said chip in an unencrypted form.

6. The method of claim 1 in which said certificate of authority includes temporal duration information which controls how long said processor is available.

7. The method of claim 1 in which said certificate of authority includes temporal information which controls when said processor is available.

8. The method of claim 7 in which said temporal information includes at least one starting time and at least one ending time.

9. The method of claim 1 in which said certificate of authority includes information which controls what processing functionality is available from said processor.

10. The method of claim 1 in which said certificate of authority includes information which controls maximum key length usable by said cryptography engine.

11. The method of claim 1 in which said chip includes a tamper boundary.

12. The method of claim 1 in which said chip includes hard coded cryptographic keys for decrypting said encrypted certificate of authority.

13. The method of claim 12 in which said keys include a chip private key, a chip public key and a third party public key.

14. The method of claim 1 in which said data is previously provided to said volatile memory in a secure fashion.

15. A system for controlling access to a processor present on an integrated circuit chip, the system comprising:
a memory; and
a processor in communication with the memory, wherein the system is capable of performing a method, said method comprising:
supplying an encrypted certificate of authority to said chip;
decrypting said encrypted certificate of authority using at least one on-chip cryptographic engine; and
granting access to said processor present on the integrated circuit chip based on said decrypted certificate of authority which is matched against data stored on said chip in a volatile memory also contained on said chip.

16. The system of claim 15 in which data confirming authenticity for said certificate of authority is stored on said chip in an encrypted form.

17. The system of claim 15 in which data confirming authenticity for said certificate of authority is stored on said chip in an unencrypted form.

18. The system of claim 15 in which said certificate of authority includes at least one of:
temporal duration information which controls how long said processor present on the integrated circuit chip is available;
temporal information which controls when said processor present on the integrated circuit chip is available;
information which controls what processing functionality is available from said processor present on the integrated circuit chip; and information which controls maximum key length usable by said cryptography engine.

19. The system of claim 18 in which said temporal information includes at least one starting time and at least one ending time.

20. The system of claim 15 in which said chip includes at least one of a tamper boundary, and hard coded cryptographic keys for decrypting said encrypted certificate of authority.

* * * * *